US010887143B2

(12) United States Patent
Guo et al.

(10) Patent No.: US 10,887,143 B2
(45) Date of Patent: Jan. 5, 2021

(54) METHOD AND APPARATUS FOR INITIAL ACCESS IN WIRELESS COMMUNICATION SYSTEMS

(71) Applicant: Samsung Electronics Co., Ltd, Suwon-si (KR)

(72) Inventors: Li Guo, Allen, TX (US); Young-Han Loong Nam, Plano, TX (US); Boon Loong Ng, Plano, TX (US); Sudhir Ramakrishna, Plano, TX (US); Yang Li, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 379 days.

(21) Appl. No.: 15/582,575

(22) Filed: Apr. 28, 2017

(65) Prior Publication Data

US 2017/0325260 A1    Nov. 9, 2017

Related U.S. Application Data

(60) Provisional application No. 62/332,637, filed on May 6, 2016, provisional application No. 62/334,756, filed
(Continued)

(51) Int. Cl.
*H04L 5/00* (2006.01)
*H04L 27/26* (2006.01)
(Continued)

(52) U.S. Cl.
CPC ........ *H04L 27/2607* (2013.01); *H04L 5/0007* (2013.01); *H04L 5/0023* (2013.01);
(Continued)

(58) Field of Classification Search
CPC ........................... H04L 5/0007; H04W 74/006
See application file for complete search history.

(56) References Cited

U.S. PATENT DOCUMENTS 8,094,611 B2 *  1/2012  Li ......................... H04B 1/707
                                                          370/328
8,289,946 B2 * 10/2012  Luo ...................... H04L 5/0007
                                                          370/208
(Continued)

OTHER PUBLICATIONS

ISA/KR, "International Search Report," Application No. PCT/KR2017/004727, dated Aug. 10, 2017, Korean Intellectual Property Office, Korea, 3 pages.
(Continued)

*Primary Examiner* — Alpus Hsu

(57) ABSTRACT

A base station includes a controller configured to map initial access signals, each initial access signal corresponding to one of a plurality of transmit beams, to a subset or all of a plurality of predefined time locations in at least one periodicity, and a transmitter configured to transmit the mapped initial access signals to a UE and indicate OFDM symbols that are not mapped with the initial access signals in the one periodicity to the UE. A UE includes a transceiver configured to receive initial access signals mapped to a subset or all of time locations in one periodicity from a base station, the each initial access signal corresponding to one of a plurality of different beams, and a controller configured to perform an initial access to the base station and receive the indication of OFDM symbols that are not mapped with the initial access signals in the one periodicity.

18 Claims, 24 Drawing Sheets

Related U.S. Application Data on May 11, 2016, provisional application No. 62/356,002, filed on Jun. 29, 2016, provisional application No. 62/374,273, filed on Aug. 12, 2016.

(51) Int. Cl.
*H04W 72/04* (2009.01)
*H04W 74/00* (2009.01)

(52) U.S. Cl.
CPC .......... *H04L 5/0035* (2013.01); *H04L 5/0082* (2013.01); *H04L 5/0092* (2013.01); *H04L 27/2602* (2013.01); *H04L 27/265* (2013.01); *H04W 72/0446* (2013.01); *H04W 72/0453* (2013.01); *H04W 74/004* (2013.01); *H04W 74/006* (2013.01)

(56) References Cited

U.S. PATENT DOCUMENTS

| | | | |
|---|---|---|---|
| 8,514,975 B2* | 8/2013 | Lee | H04L 5/005 341/180 |
| 8,559,354 B2* | 10/2013 | Kwon | H04L 5/0023 370/312 |
| 8,730,850 B2* | 5/2014 | Noh | H04L 5/0023 370/280 |
| 8,750,257 B2* | 6/2014 | Chung | H04J 13/00 370/335 |
| 8,982,788 B2* | 3/2015 | Han | H04J 11/0079 370/328 |
| 9,078,109 B2* | 7/2015 | He | H04L 51/38 |
| 9,215,054 B2* | 12/2015 | Han | H04J 11/0079 |
| 9,408,168 B2* | 8/2016 | Seo | H04J 11/0069 |
| 9,521,665 B2* | 12/2016 | Park | H04B 7/024 |
| 9,526,085 B2* | 12/2016 | Yen | H04L 5/0053 |
| 9,538,518 B2* | 1/2017 | Seo | H04L 5/0053 |
| 9,585,044 B2* | 2/2017 | Park | H04W 24/10 |
| 9,712,302 B2* | 7/2017 | He | H04L 5/0048 |
| 9,769,628 B2* | 9/2017 | Kim | H04W 4/06 |
| 9,867,192 B2* | 1/2018 | Krzymien | H04B 7/0639 |
| 9,900,863 B2* | 2/2018 | Lee | H04W 72/042 |
| 9,986,558 B2* | 5/2018 | Fang | H04W 72/04 |
| 10,034,253 B2* | 7/2018 | Hashemi | H04J 11/0069 |
| 10,187,169 B2* | 1/2019 | Sadiq | H04J 11/0069 |
| 10,231,241 B2* | 3/2019 | Kim | H04B 7/0617 |
| 10,326,514 B2* | 6/2019 | Xiong | H04J 11/0079 |
| 10,356,737 B2* | 7/2019 | Ringh | H04W 56/0015 |
| 10,602,494 B2* | 3/2020 | Shimezawa | H04L 27/0006 |
| 2010/0322174 A1* | 12/2010 | Ji | H04W 74/0833 370/329 |
| 2013/0148645 A1* | 6/2013 | Hwang | H04W 56/0085 370/350 |
| 2013/0230013 A1* | 9/2013 | Seo | H04L 27/2602 370/329 |
| 2014/0112287 A1* | 4/2014 | Chun | H04L 5/0023 370/329 |
| 2014/0225777 A1 | 8/2014 | Harel et al. | |
| 2014/0328312 A1* | 11/2014 | Seo | H04L 1/1861 370/329 |
| 2014/0334566 A1 | 11/2014 | Kim et al. | |
| 2015/0092768 A1* | 4/2015 | Ng | H04W 48/16 370/350 |
| 2015/0124759 A1* | 5/2015 | Seo | H04L 1/1861 370/329 |
| 2015/0208443 A1 | 7/2015 | Jung et al. | |
| 2016/0043887 A1* | 2/2016 | Han | H04J 11/0079 370/312 |
| 2016/0044706 A1* | 2/2016 | Yang | H04L 5/005 370/329 |
| 2016/0080136 A1* | 3/2016 | Yang | H04L 5/001 370/280 |
| 2016/0081107 A1* | 3/2016 | Yang | H04L 5/001 370/280 |
| 2016/0087707 A1 | 3/2016 | Guey et al. | |
| 2016/0105872 A1 | 4/2016 | Kuo | |
| 2016/0119910 A1 | 4/2016 | Krzymien et al. | |
| 2016/0142241 A1* | 5/2016 | Sahlin | H04J 11/0073 370/329 |
| 2016/0142989 A1* | 5/2016 | Hashemi | H04J 11/0069 370/350 |
| 2016/0157267 A1 | 6/2016 | Frenne et al. | |
| 2016/0337101 A1* | 11/2016 | Gao | H04W 24/10 |
| 2017/0064685 A1* | 3/2017 | Rico Alvarino | H04W 72/005 |
| 2017/0223649 A1* | 8/2017 | Ko | H04L 5/0053 |
| 2017/0230869 A1* | 8/2017 | Kubota | H04L 5/0048 |
| 2017/0288848 A1* | 10/2017 | Lei | H04L 27/2656 |
| 2017/0303241 A1* | 10/2017 | Yang | H04W 72/04 |
| 2018/0219667 A1* | 8/2018 | Zhao | H04W 72/1289 |
| 2018/0376405 A1* | 12/2018 | Han | H04J 11/0069 |

OTHER PUBLICATIONS

ISA/KR, "Written Opinion of the International Searching Authority," Application No. PCT/KR2017/004727, dated Aug. 10, 2017, Korean Intellectual Property Office, Korea, 4 pages.

Technical Specification. LTE; Evolved Universal Terrestrial Radio Access (E-UTRA); Physical Channels and Modulation; 3GPP TS 36.211 version 13.0.0 Release 13; ETSI TS 136 211 v13.0.0 (Jan. 2016), 143 pages.

Technical Specification. LTE; Evolved Universal Terrestrial Radio Access (E-UTRA); Multiplexing and Channel Coding; 3GPP TS 36.212 version 13.0.0 Release 13; ETSI TS 136 212 v13.0.0 (Jan. 2016), 123 pages.

Technical Specification. LTE; Evolved Universal Terrestrial Radio Access (E-UTRA); Physical Layer Procedures; 3GPP TS 36.213 version 13.0.0 Release 13; ETSI TS 136 213 V13.0.0 (May 2016), 328 pages.

Technical Specification. LTE; Evolved Universal Terrestrial Radio Access (E-UTRA); Radio Resource Control (RRC); Protocol Specification; 3GPP TS 36.331 version 13.0.0 Release 13; ETSI TS 136 331 V13.0.0 (Jan. 2016), 670 pages.

* cited by examiner

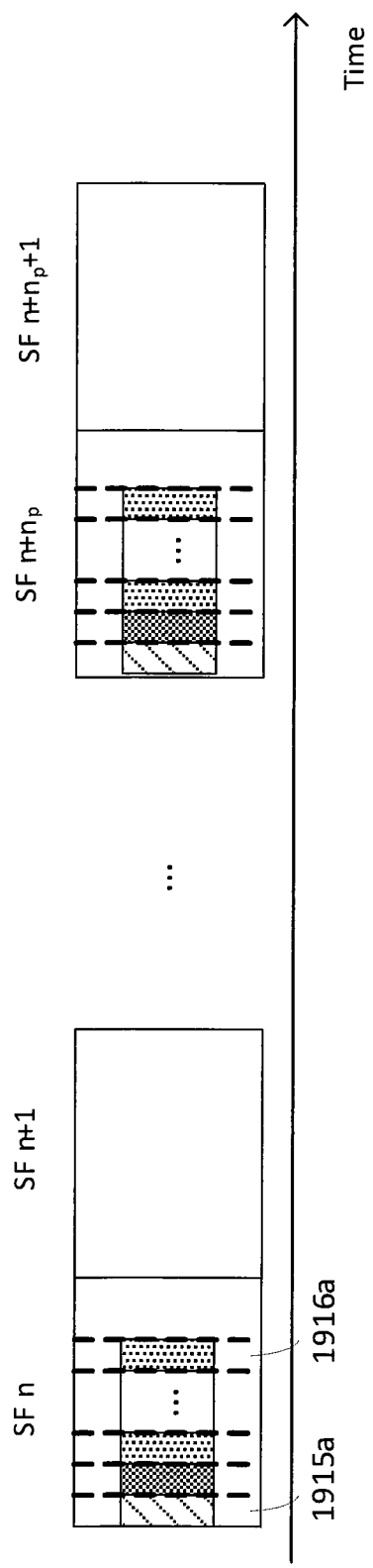
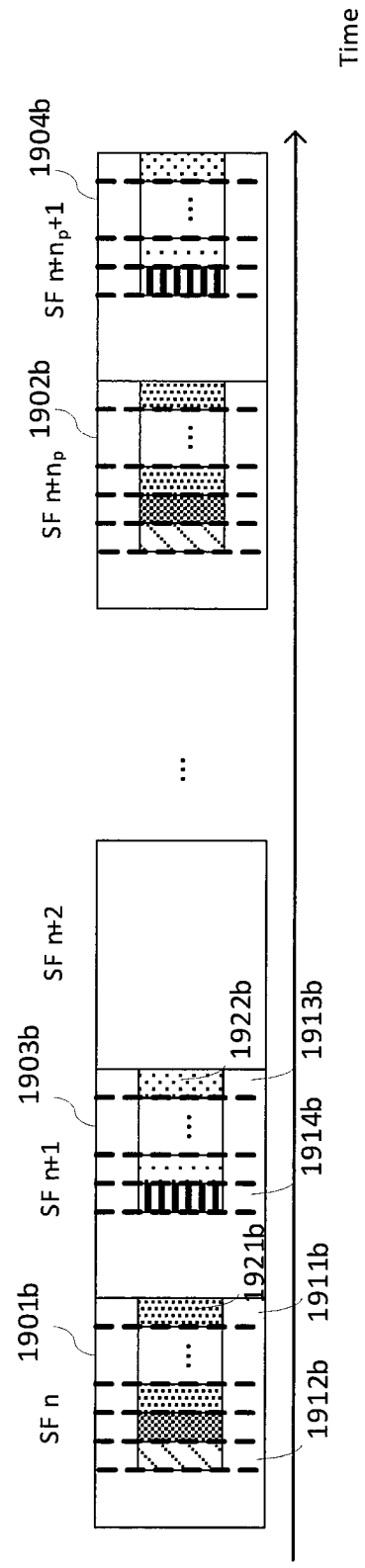
FIGURE 19A
FIGURE 19B

METHOD AND APPARATUS FOR INITIAL ACCESS IN WIRELESS COMMUNICATION SYSTEMS

CROSS-REFERENCE TO RELATED APPLICATIONS AND CLAIMS OF PRIORITY

This application claims priority under 35 U.S.C. § 119(e) to: U.S. Provisional Patent Application No. 62/332,637 filed on May 6, 2016; U.S. Provisional Patent Application No. 62/334,756 filed on May 11, 2016; U.S. Provisional Patent Application No. 62/356,002 filed on Jun. 29, 2016; and U.S. Provisional Patent Application No. 62/374,273 filed on Aug. 12, 2016. The above-identified provisional patent applications are hereby incorporated by reference in their entirety.

TECHNICAL FIELD

This disclosure relates generally to wireless communication systems. More specifically, this disclosure relates to method and apparatus for the configuration and transmission of initial access signals. The present disclosure also relates to supporting signaling of quasi-colocation of antenna ports or beams for transmissions from user equipments (UEs) to a base station or for transmissions from a base station to UEs.

BACKGROUND

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage is of paramount importance.

SUMMARY

Various embodiments of the present disclosure provide methods and apparatuses for an initial access operation in the wireless systems.

In a first embodiment, a base station includes a controller configured to map at least one initial access signal corresponding to one of a plurality of transmit beams to one or more orthogonal frequency division multiplexing (OFDM) symbols in at least one subframe, and a transmitter configured to transmit the mapped at least one initial access signal to a user equipment (UE).

In a second embodiment, a method for operating a base station includes mapping at least one initial access signal corresponding to one of a plurality of transmit beams to one or more orthogonal frequency division multiplexing (OFDM) symbols in at least one subframe, and transmitting the mapped at least one initial access signal to a user equipment (UE).

In a third embodiment, a user equipment (UE) includes a transceiver configured to receive at least one initial access signal mapped to one or more orthogonal frequency division multiplexing (OFDM) symbols in at least one subframe from a base station, the at least one initial access signal corresponding to one of a plurality of different beams, and a controller configured to perform an initial access to the base station via the one of a plurality of different beams based on the at least one initial access signal.

In some embodiments, the at least one initial access signal comprises a plurality of initial access signals, wherein each of the plurality of initial access signals includes a physical cell ID and a respective OFDM symbol index, corresponding to each of the plurality of transmit beams, and the base station is further configured to map each of the plurality of initial access signals to each of a plurality of OFDM symbols in the at least one subframe.

In some embodiments, the plurality of OFDM symbols are consecutive one another, starting from either a last OFDM symbol or a first OFDM symbol in a subframe, and data and control messages are mapped to OFDM symbols that are not mapped with initial access signal in a subframe.

In some embodiments, each of the plurality of OFDM symbols locates at a same OFDM index of each of a plurality of subframes.

In some embodiments, the at least one initial access signal includes a physical cell identification (ID) and an OFDM symbol index, and further includes a subframe number.

In some embodiments, the base station is further configured to transmit an extended synchronization signal (ESS) to the UE to enable the UE to determine an index of the OFDM symbol in which an initial access signal block is transmitted.

In some embodiments, the base station is further configured to transmit a Physical Broadcast Channel (PBCH) to the UE, wherein a first portion of the PBCH conveys an index of the OFDM symbol in which an initial access signal block is transmitted and a second portion of the PBCH conveys a number of the plurality of transmit beams being utilized by the base station.

Other technical features may be readily apparent to one skilled in the art from the following figures, descriptions, and claims.

Before undertaking the DETAILED DESCRIPTION below, it can be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller can be implemented in hardware or a combination of hardware and software and/or firmware. The functionality associated with any particular controller can be centralized or distributed, whether locally or remotely. The phrase "at least one of," when used with a list of items, means that different combinations of one or more of the listed items can be used, and only one item in the list can be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 19A to 19C illustrate embodiments in which initial-access signals are transmitted in two contiguous subframes in accordance with the present disclosure;

DETAILED DESCRIPTION

FIGS. 1 through 26, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

The following documents and standards descriptions are hereby incorporated by reference into the present disclosure as if fully set forth herein: 3rd generation partnership project (3GPP) TS 36.211 v13.0.0, "E-UTRA, Physical channels and modulation" ("REF 1"); 3GPP TS 36.212 v13.0.0, "E-UTRA, Multiplexing and Channel coding" ("REF 2"); 3GPP TS 36.213 v13.0.0, "E-UTRA, Physical Layer Procedures" ("REF 3"); 3GPP TS 36.331 v13.0.0, and "E-UTRA, Radio Resource Control (RRC) Protocol Specification" ("REF 4").

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

It should be noted that further embodiments of the present disclosure may be derived by utilizing a combination of several of the embodiments listed below. Also, it should be noted that further embodiments of the present disclosure may be derived by utilizing a particular subset of operational steps as disclosed in each of these embodiments. The present disclosure should be understood to cover all such embodiments.

Figure 1:
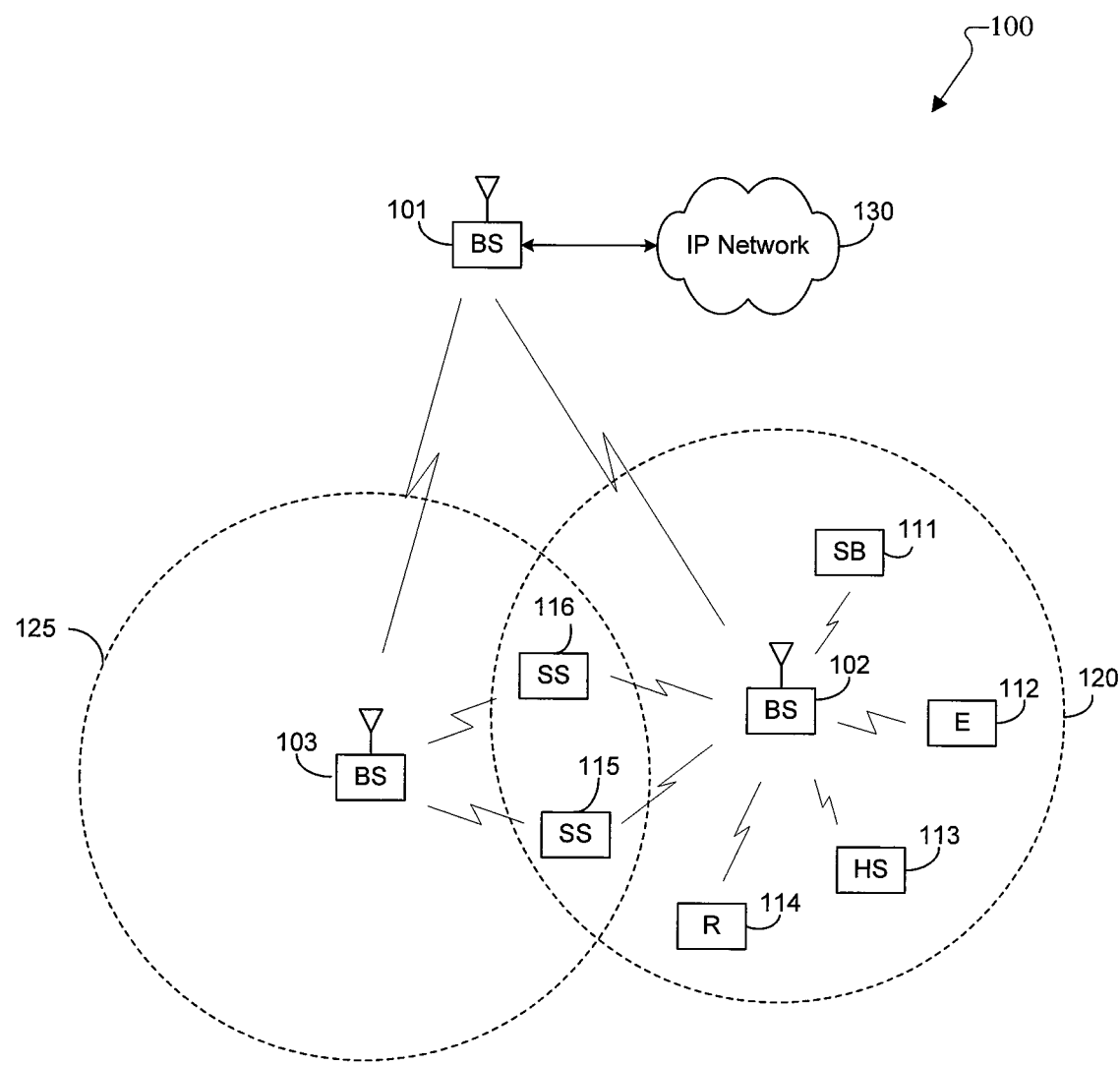
FIG. 1 illustrates an example wireless network according to some embodiments of the present disclosure.

FIG. 1 illustrates an example wireless network 100 according to some embodiments of the present disclosure. The embodiment of the wireless network 100 shown in FIG. 1 is for illustration only. Other embodiments of the wireless network 100 could be used without departing from the scope of this disclosure.

The wireless network 100 includes an eNodeB (eNB) 101, an eNB 102, and an eNB 103. The eNB 101 communicates with the eNB 102 and the eNB 103. The eNB 101 also communicates with at least one Internet Protocol (IP) network 130, such as the Internet, a proprietary IP network, or other data network.

Depending on the network type, other well-known terms may be used instead of "eNodeB" or "eNB," "gNB," such as "base station" or "access point." For the sake of convenience, the terms "eNodeB" and "eNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an eNB, whether the UE is a mobile device (such as a mobile telephone or smartphone) or is normally considered a stationary device (such as a desktop computer or vending machine).

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M) like a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, long-term evolution (LTE), LTE-A, WiMAX, or other advanced wireless communication techniques.

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one or more of BS 101, BS 102 and BS 103 include 2D antenna arrays as described in embodiments of the present disclosure. In some embodiments, one or more of BS 101, BS 102 and BS 103 support an initial access operation in the wireless systems.

Although FIG. 1 illustrates one example of a wireless network 100, various changes may be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNB 101, 102, and/or 103 could provide access to other or additional external networks, such as external telephone networks or other types of data networks.

Figure 2A:
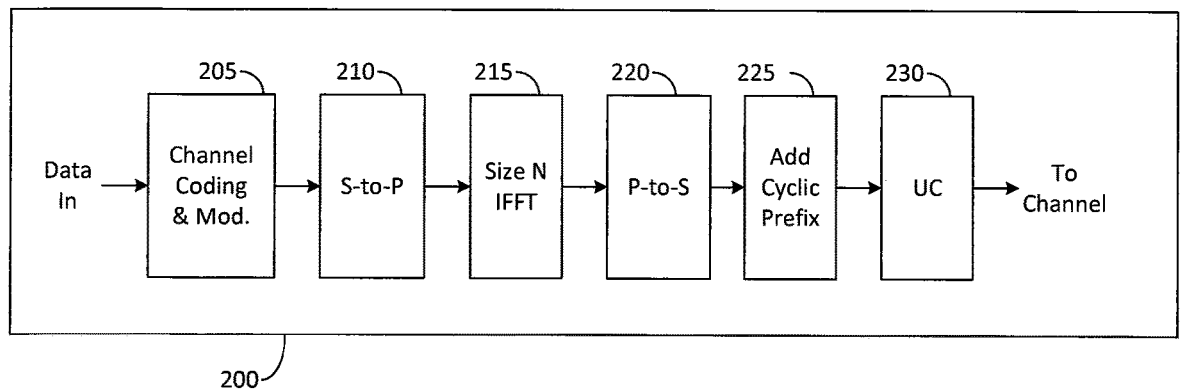
FIGS. 2A and 2B illustrate example wireless transmit and receive paths according to some embodiments of the present disclosure.
Figure 2B:
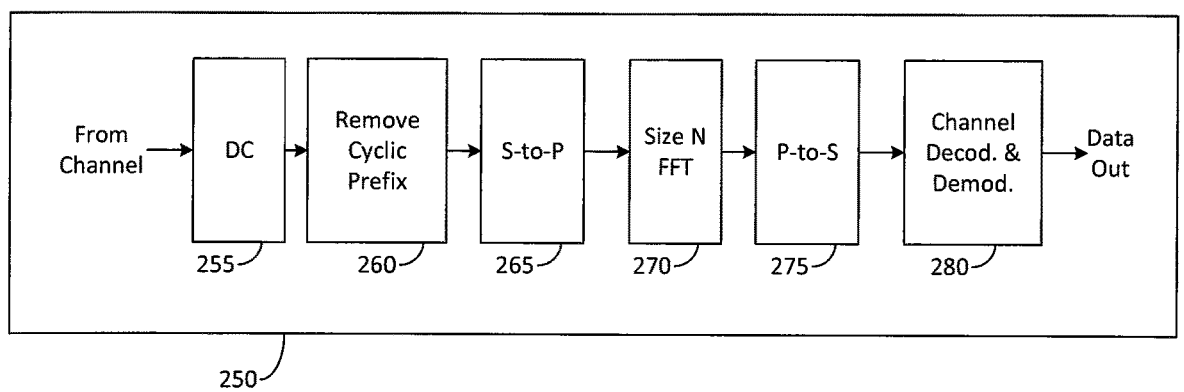

FIGS. 2A and 2B illustrate example wireless transmit and receive paths according to some embodiments of the present disclosure. In the following description, a transmit path 200 may be described as being implemented in an eNB (such as eNB 102), while a receive path 250 may be described as being implemented in a UE (such as UE 116). However, it will be understood that the receive path 250 could be implemented in an eNB and that the transmit path 200 could be implemented in a UE. In some embodiments, the receive path 250 is configured to support an initial access operation in the wireless systems.

The transmit path 200 includes a channel coding and modulation block 205, a serial-to-parallel (S-to-P) block 210, a size N Inverse Fast Fourier Transform (IFFT) block 215, a parallel-to-serial (P-to-S) block 220, an add cyclic prefix block 225, and an up-converter (UC) 230. The receive path 250 includes a down-converter (DC) 255, a remove cyclic prefix block 260, a serial-to-parallel (S-to-P) block 265, a size N Fast Fourier Transform (FFT) block 270, a parallel-to-serial (P-to-S) block 275, and a channel decoding and demodulation block 280.

In the transmit path 200, the channel coding and modulation block 205 receives a set of information bits, applies coding (such as a low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The serial-to-parallel block 210 converts (such as de-multiplexes) the serial modulated symbols to parallel data in order to generate N parallel symbol streams, where N is the IFFT/FFT size used in the eNB 102 and the UE 116. The size N IFFT block 215 performs an IFFT operation on the N parallel symbol streams to generate time-domain output signals. The parallel-to-serial block 220 converts (such as multiplexes) the parallel time-domain output symbols from the size N IFFT block 215 in order to generate a serial time-domain signal. The add cyclic prefix block 225 inserts a cyclic prefix to the time-domain signal. The up-converter 230 modulates (such as up-converts) the output of the add cyclic prefix block 225 to an RF frequency for transmission via a wireless channel. The signal may also be filtered at baseband before conversion to the RF frequency.

A transmitted RF signal from the eNB 102 arrives at the UE 116 after passing through the wireless channel, and reverse operations to those at the eNB 102 are performed at the UE 116. The down-converter 255 down-converts the received signal to a baseband frequency, and the remove cyclic prefix block 260 removes the cyclic prefix to generate a serial time-domain baseband signal. The serial-to-parallel block 265 converts the time-domain baseband signal to parallel time domain signals. The size N FFT block 270 performs an FFT algorithm to generate N parallel frequency-domain signals. The parallel-to-serial block 275 converts the parallel frequency-domain signals to a sequence of modulated data symbols. The channel decoding and demodulation block 280 demodulates and decodes the modulated symbols to recover the original input data stream.

Each of the eNBs 101-103 may implement a transmit path 200 that is analogous to transmitting in the downlink to UEs 111-116 and may implement a receive path 250 that is analogous to receiving in the uplink from UEs 111-116. Similarly, each of UEs 111-116 may implement a transmit path 200 for transmitting in the uplink to eNBs 101-103 and may implement a receive path 250 for receiving in the downlink from eNBs 101-103.

Each of the components in FIGS. 2A and 2B can be implemented using only hardware or using a combination of hardware and software/firmware. As a particular example, at least some of the components in FIGS. 2A and 2B may be implemented in software, while other components may be implemented by configurable hardware or a mixture of software and configurable hardware. For instance, the FFT block 270 and the IFFT block 215 may be implemented as configurable software algorithms, where the value of size N may be modified according to the implementation.

Furthermore, although described as using FFT and IFFT, this is by way of illustration only and should not be construed to limit the scope of this disclosure. Other types of transforms, such as Discrete Fourier Transform (DFT) and Inverse Discrete Fourier Transform (IDFT) functions, could be used. It will be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIGS. 2A and 2B illustrate examples of wireless transmit and receive paths, various changes may be made to FIGS. 2A and 2B. For example, various components in FIGS. 2A and 2B could be combined, further subdivided, or omitted and additional components could be added according to particular needs. Also, FIGS. 2A and 2B are meant to illustrate examples of the types of transmit and receive paths that could be used in a wireless network. Any other suitable architectures could be used to support wireless communications in a wireless network.

Figure 3A:
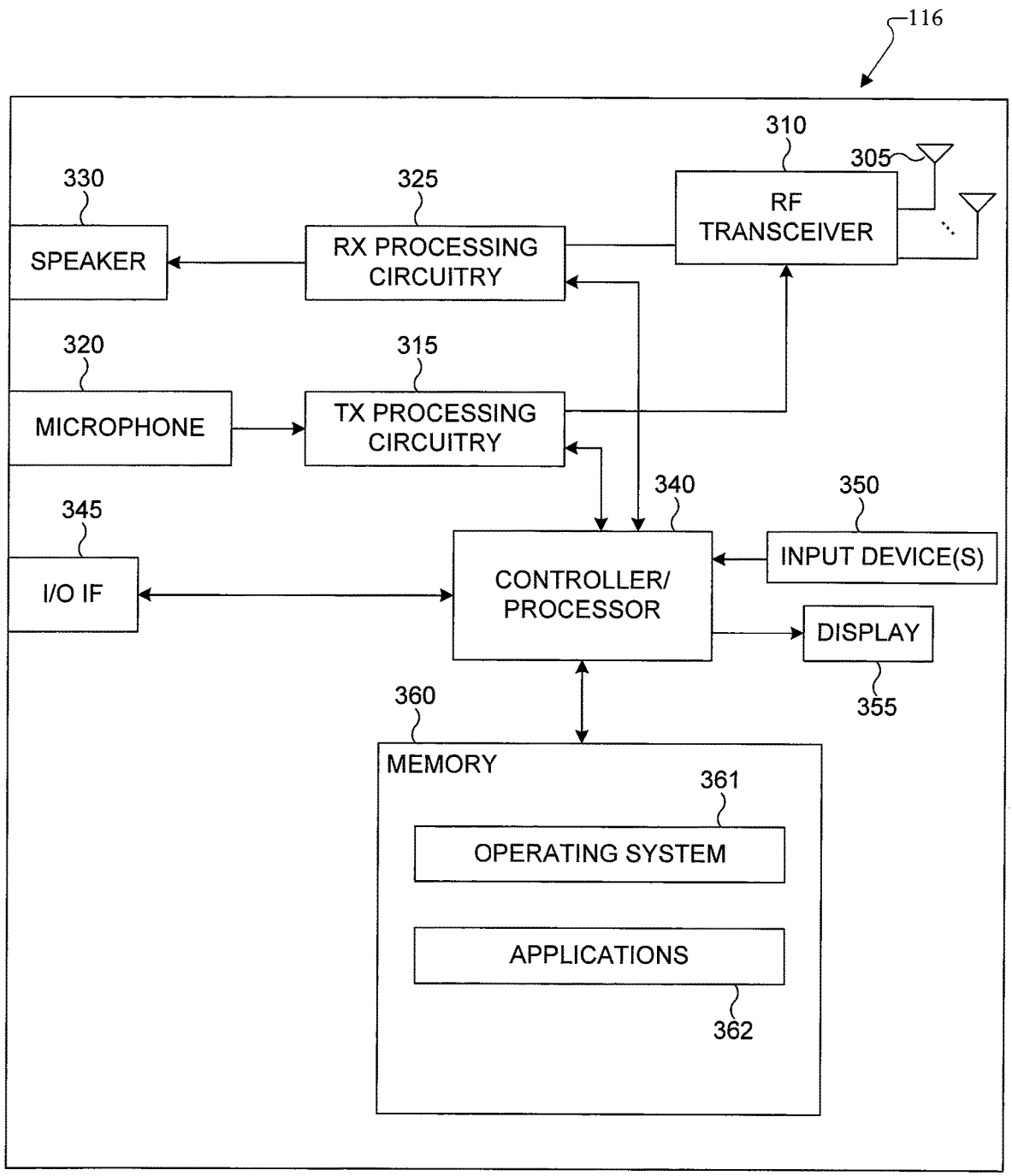
FIG. 3A illustrates an example user equipment according to some embodiments of the present disclosure.

FIG. 3A illustrates an example UE 116 according to some embodiments of the present disclosure. The embodiment of the UE 116 illustrated in FIG. 3A is for illustration only, and the UEs 111-115 of FIG. 1 could have the same or similar configuration. However, UEs come in a wide variety of configurations, and FIG. 3A does not limit the scope of this disclosure to any particular implementation of a UE.

The UE 116 includes an antenna 305, a radio frequency (RF) transceiver 310, transmit (TX) processing circuitry 315, a microphone 320, and receive (RX) processing circuitry 325. The UE 116 also includes a speaker 330, a main processor 340, an input/output (I/O) interface (IF) 345, a keypad 350, a display 355, and a memory 360. The memory 360 includes a basic operating system (OS) program 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the main processor 340 for further processing (such as for web browsing data).

The TX processing circuitry 315 receives analog or digital voice data from the microphone 320 or other outgoing baseband data (such as web data, e-mail, or interactive video game data) from the main processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The main processor 340 can include one or more processors or other processing devices and execute the basic OS program 361 stored in the memory 360 in order to control the overall operation of the UE 116. For example, the main processor 340 could control the reception of forward channel signals and the transmission of reverse channel signals by the RF transceiver 310, the RX processing circuitry 325, and the TX processing circuitry 315 in accordance with well-known principles. In some embodiments, the main processor 340 includes at least one microprocessor or microcontroller.

The main processor 340 is also capable of executing other processes and programs resident in the memory 360, such as operations for channel quality measurement and reporting for systems having 2D antenna arrays as described in embodiments of the present disclosure as described in embodiments of the present disclosure. The main processor 340 can move data into or out of the memory 360 as required by an executing process. In some embodiments, the main processor 340 is configured to execute the applications 362 based on the OS program 361 or in response to signals received from eNBs or an operator. The main processor 340 is also coupled to the I/O interface 345, which provides the UE 116 with the ability to connect to other devices such as laptop computers and handheld computers. The I/O interface 345 is the communication path between these accessories and the main controller 340.

The main processor 340 is also coupled to the keypad 350 and the display unit 355. The operator of the UE 116 can use the keypad 350 to enter data into the UE 116. The display 355 may be a liquid crystal display or other display capable of rendering text and/or at least limited graphics, such as from web sites.

The memory 360 is coupled to the main processor 340. Part of the memory 360 could include a random access memory (RAM), and another part of the memory 360 could include a Flash memory or other read-only memory (ROM).

Although FIG. 3A illustrates one example of UE 116, various changes may be made to FIG. 3A. For example, various components in FIG. 3A could be combined, further subdivided, or omitted and additional components could be added according to particular needs. As a particular example, the main processor 340 could be divided into multiple processors, such as one or more central processing units (CPUs) and one or more graphics processing units (GPUs). Also, while FIG. 3A illustrates the UE 116 configured as a mobile telephone or smartphone, UEs could be configured to operate as other types of mobile or stationary devices.

Figure 3B:
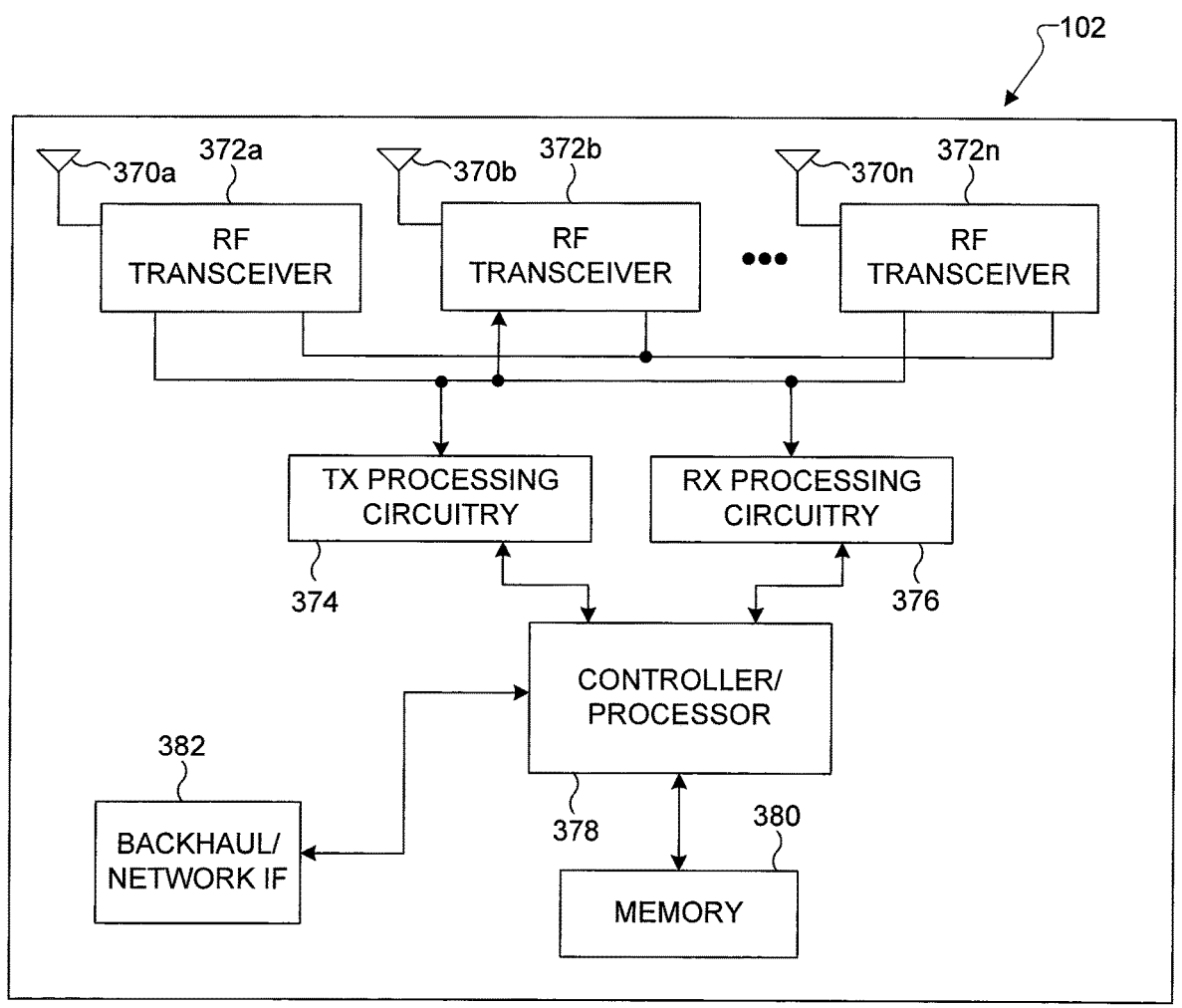
FIG. 3B illustrates an example enhanced NodeB (eNB) according to some embodiments of the present disclosure.

FIG. 3B illustrates an example eNB 102 according to some embodiments of the present disclosure. The embodiment of the eNB 102 shown in FIG. 3B is for illustration only, and other eNBs of FIG. 1 could have the same or similar configuration. However, eNBs come in a wide variety of configurations, and FIG. 3B does not limit the scope of this disclosure to any particular implementation of an eNB. It is noted that eNB 101 and eNB 103 can include the same or similar structure as eNB 102.

As shown in FIG. 3B, the eNB 102 includes multiple antennas 370a-370n, multiple RF transceivers 372a-372n, transmit (TX) processing circuitry 374, and receive (RX) processing circuitry 376. In certain embodiments, one or more of the multiple antennas 370a-370n include 2D antenna arrays. The eNB 102 also includes a controller/processor 378, a memory 380, and a backhaul or network interface 382.

The RF transceivers 372a-372n receive, from the antennas 370a-370n, incoming RF signals, such as signals transmitted by UEs or other eNBs. The RF transceivers 372a-372n down-convert the incoming RF signals to generate IF or baseband signals. The IF or baseband signals are sent to the RX processing circuitry 376, which generates processed baseband signals by filtering, decoding, and/or digitizing the baseband or IF signals. The RX processing circuitry 376 transmits the processed baseband signals to the controller/processor 378 for further processing.

The TX processing circuitry 374 receives analog or digital data (such as voice data, web data, e-mail, or interactive video game data) from the controller/processor 378. The TX processing circuitry 374 encodes, multiplexes, and/or digitizes the outgoing baseband data to generate processed baseband or IF signals. The RF transceivers 372a-372n receive the outgoing processed baseband or IF signals from the TX processing circuitry 374 and up-converts the baseband or IF signals to RF signals that are transmitted via the antennas 370a-370n.

The controller/processor 378 can include one or more processors or other processing devices that control the overall operation of the eNB 102. For example, the controller/processor 378 could control the reception of forward channel signals and the transmission of reverse channel signals by the RF transceivers 372a-372n, the RX processing circuitry 376, and the TX processing circuitry 374 in accordance with well-known principles. The controller/processor 378 could support additional functions as well, such as more advanced wireless communication functions. For instance, the controller/processor 378 can perform the blind interference sensing (BIS) process, such as performed by a BIS algorithm, and decodes the received signal subtracted by the interfering signals. Any of a wide variety of other functions could be supported in the eNB 102 by the controller/processor 378. In some embodiments, the controller/processor 378 includes at least one microprocessor or microcontroller.

The controller/processor 378 is also capable of executing programs and other processes resident in the memory 380, such as a basic OS. The controller/processor 378 is also capable of supporting an initial access operation in the wireless systems as described in embodiments of the present disclosure. In some embodiments, the controller/processor 378 supports communications between entities, such as web Real-Time Communication (RTC). The controller/processor 378 can move data into or out of the memory 380 as required by an executing process.

The controller/processor 378 is also coupled to the backhaul or network interface 382. The backhaul or network interface 382 allows the eNB 102 to communicate with other devices or systems over a backhaul connection or over a network. The interface 382 could support communications over any suitable wired or wireless connection(s). For example, when the eNB 102 is implemented as part of a cellular communication system (such as one supporting 5G, LTE, or LTE-A), the interface 382 could allow the eNB 102 to communicate with other eNBs over a wired or wireless backhaul connection. When the eNB 102 is implemented as an access point, the interface 382 could allow the eNB 102 to communicate over a wired or wireless local area network or over a wired or wireless connection to a larger network (such as the Internet). The interface 382 includes any suitable structure supporting communications over a wired or wireless connection, such as an Ethernet or RF transceiver.

The memory 380 is coupled to the controller/processor 378. Part of the memory 380 could include a RAM, and another part of the memory 380 could include a Flash memory or other ROM. In certain embodiments, a plurality of instructions, such as a BIS algorithm is stored in memory. The plurality of instructions are configured to cause the controller/processor 378 to perform the BIS process and to decode a received signal after subtracting out at least one interfering signal determined by the BIS algorithm.

As described in more detail below, the transmit and receive paths of the eNB 102 (implemented using the RF transceivers 372a-372n, TX processing circuitry 374, and/or RX processing circuitry 376) support communication with aggregation of FDD cells and TDD cells.

Although FIG. 3B illustrates one example of an eNB 102, various changes may be made to FIG. 3B. For example, the eNB 102 could include any number of each component shown in FIG. 3. As a particular example, an access point could include a number of interfaces 382, and the controller/processor 378 could support routing functions to route data between different network addresses. As another particular example, while shown as including a single instance of TX processing circuitry 374 and a single instance of RX processing circuitry 376, the eNB 102 could include multiple instances of each (such as one per RF transceiver).

Before a UE can receive or transmit data to an eNB, the UE first needs to perform a cell search procedure in order to acquire time and frequency synchronization with the eNB. The 4 main synchronization requirements are: 1) Symbol, subframe, and frame timing, 2) Carrier frequency offset (CFO) correction, 3) Sampling clock synchronization, and 4) Physical Cell ID (PCI) detection and potentially some other cell-specific parameters.

Figure 4:
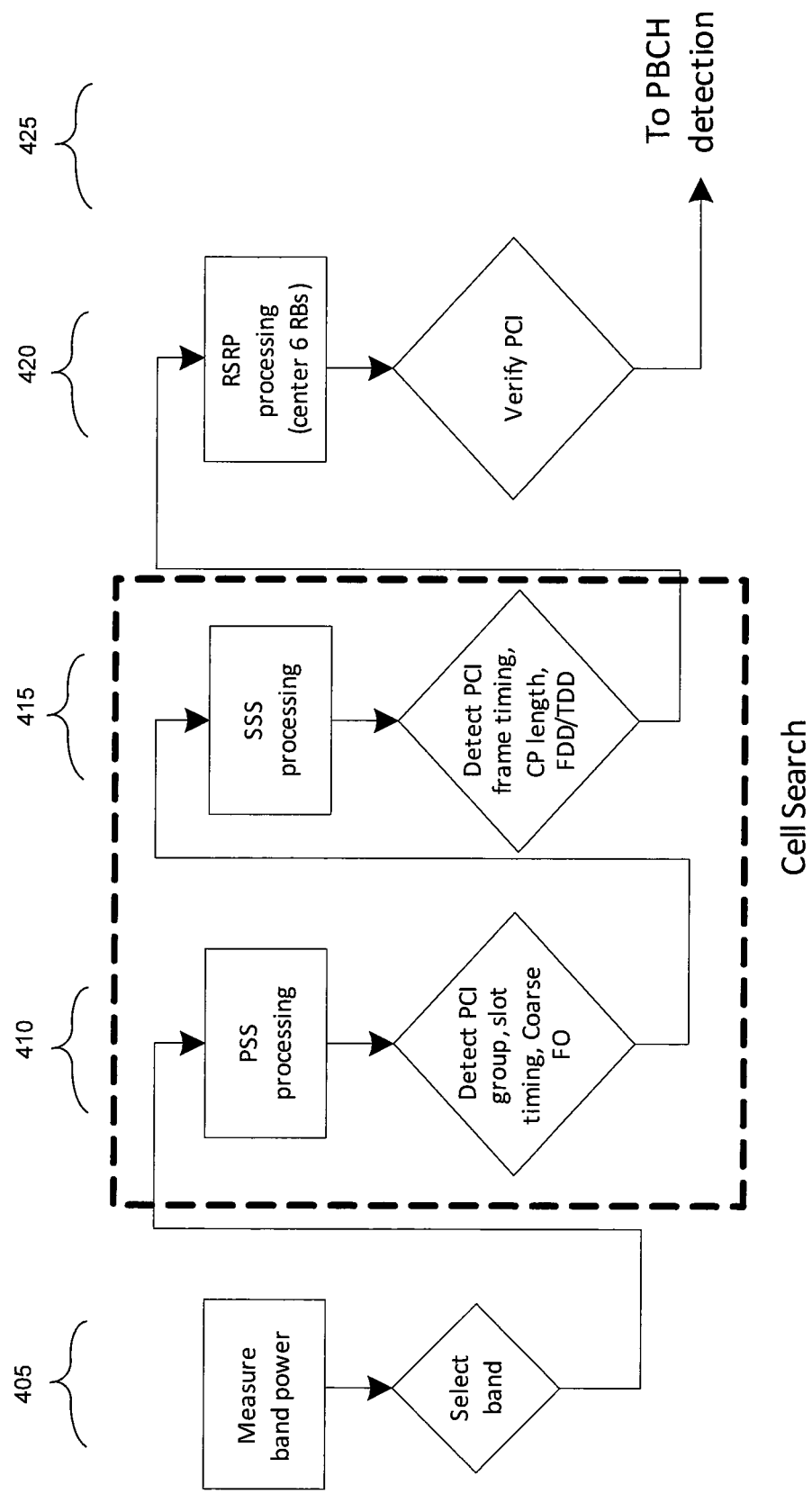
FIG. 4 illustrates an example synchronization operation performed by a user equipment (UE) according to embodiments of the present disclosure.

FIG. 4 illustrates an example synchronization operation performed by a user equipment according to embodiments.

In step 405, after power on, a UE tunes its RF and attempts to measure the wideband received signal strength indicator (RSSI) at specific frequencies (channels, as commanded by higher layer) over a set of supported frequency bands one after another, and rank associated cells based on respective RSSI values.

In step 410, the UE uses downlink synchronization channels, that is locally stored primary synchronization signal (PSS) and secondary synchronization signal (SSS) to correlate with a received signal. The UE first finds the PSS, that is located, for example for a FDD system, in a last symbol of a first time slot of a first and a sixth subframes in a frame. This enables the UE to synchronize with the eNB at the subframe level. The PSS detection helps the UE with the slot timing detection and the physical layer cell identity (PCI) detection (0, 1, 2) based on 3 sequences. The 3 sequences are used for PSS to mitigate so-called single frequency network (SFN) effect where a correlation output can exceed a cyclic prefix (CP) length.

In step 415, the SSS symbols are also located in the same subframe as PSS but in the symbol before PSS for a FDD system. From the SSS, the UE is able to obtain the PCI group number (0 to 167). The SSS enables determination of additional parameters such as radio subframe timing determination, CP length determination and whether the eNB uses FDD or TDD. The process is depicted in the LTE cell search procedure shown in FIG. 4.

In step 420, once a UE knows the PCI for a given cell, the UE also knows the location of cell-specific reference signals (CRS) that are used for channel estimation, cell selection/reselection and handover procedures. After channel estimation using CRS, equalization is performed to remove channel impairments from received symbols.

In step 425, in case of initial synchronization, a UE can decode a primary broadcast channel (PBCH) to obtain a master information block (MIB) that carries critical system information such as the DL bandwidth, CRS transmit power, number of eNB transmitter antennas, system frame number (SFN), and a configuration for a physical hybrid-ARQ channel (PHICH).

TABLE 1 below shows SSS locations relative to PSS locations for both the TDD-based and FDD-based systems. In case of FDD, PSS is always transmitted in the last symbol of a slot to enable the UE to acquire slot timing independent of the CP length. Since a UE does not know a CP length in advance, the UE needs to examine a total of 4 possible SSS locations when the UE is searching for either FDD or TDD cells. Two SSS codes are used which alternate between the 1$^{st}$ and 2$^{nd}$ SSS transmissions in the sub-frame which enables the UE to determine the radio timing from a single observation of the SSS, which can be beneficial for UEs handing over to LTE from another RAT.

TABLE 1

| | Subframe | | | | | | | | | |
|---|---|---|---|---|---|---|---|---|---|---|
| | 0 | 1 | 2 | 3 | 4 | 5 | 6 | 7 | 8 | 9 |
| FDD | PSS (#6) SSS (#5) | | | | | PSS (#6) SSS (#5) | | | | |
| TDD | SSS (#13) | PSS (#2) | | | | SSS (#13) | PSS (#2) | | | |

Figure 5:
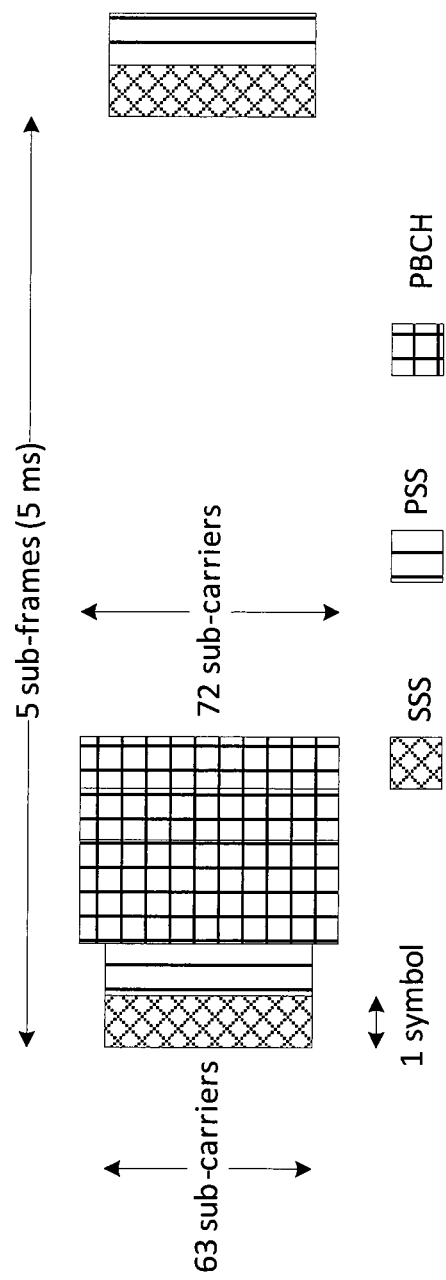
FIG. 5 illustrates an example frame structure of the primary synchronization signal (PSS)/secondary synchronization signal (SSS)/physical broadcast channel (PBCH) transmission in the FDD configuration according to embodiments of the present disclosure.

FIG. 5 illustrates an example frame structure of the PSS/SSS/PBCH transmission in the FDD configuration according to embodiments of the present disclosure.

The PSS and SSS are always transmitted in the central 6 RBs so that even a minimum bandwidth UE can detect the signals. In case of multiple transmit antennas, PSS and SSS are always transmitted from the same antenna port in a given sub-frame while they can be switched in between subframes for antenna diversity. The PBCH carriers the MIB with just 14 bits that carries some of the most frequently transmitted parameters essential for initial access to the cell, such as the DL system bandwidth, PHICH size, and the SFN number. It is repeated every 40 msec.

The PSS and SSS are always transmitted in the central 6 resource blocks (RBs) of a DL system bandwidth so that they can be detected by a UE before the UE determines the DL system bandwidth, assuming that a minimum DL system bandwidth is 6 RBs. The PSS is generated by a Zadoff-Chu (ZC) sequence of length 63 in the frequency domain with the middle element punctured to avoid transmitting on the DC subcarrier. ZC sequences satisfy a constant amplitude zero autocorrelation (CAZAC) property that enables the PSS to have characteristics of time/frequency flatness (resulting to low PAPR/CM and no dynamic range in frequency domain), good auto/cross-correlation profiles, low complexity detection at UE (by exploiting complex conjugate property, e.g. u1=29 and u2=63−29=34, and by exploiting central symmetry property in both time and frequency domain), and so on. However, due to the duality of the CAZAC property in the time and frequency domains, a shift of a ZC sequence in the frequency domain is also translated in time domain, and the reverse. Therefore, in the context of timing synchronization using ZC sequences, a frequency/time offset displays the time/frequency offset, respectively, and the offset in these two dimensions cannot be distinguished. The central root indices in the available root ZC sequence index vector have less frequency offset sensitivity and, for this reason, the root indices u=25, 29 and 34 were selected in LTE to provide three cell IDs within a cell ID group. The selection of the root indices also considered partial correlation to overcome large frequency offset in initial cell search. Due to the phase rotation in time domain as a result of a large frequency offset, partial correlations need to be considered not only for ZC sequences but also for other sequences under large frequency offset operation especially in initial cell search although a window size for each partial correlation can be different depending on the exact design.

A PSS sequence x(n) is composed of a length $N_{ZC}$ root $u_i$ ZC sequence and is given by:

$$x(n) = e^{\frac{j\pi u_i n(n+1)}{N_{ZC}}}, n = 0, 1, \ldots, N_{ZC} - 1 \quad \text{(EQUATION 1)}$$

The LTE ZC sequence is mapped to achieve the central symmetry property (i.e. index 5 corresponds to the DC sub-carrier for a RB that includes 12 sub-carriers indexed from 0 to 11). The SSS sequences are based on M-sequences. 168 sequences are generated by frequency domain interleaving of two length-31 BPSK-modulated M-sequences, where the two length-31M-sequences are derived from two different cyclic shifts of a single length-31 M-sequence. The two part structure of the SSS leads to side-lobes during cross-correlation and scrambling is used to mitigate the side lobes. For SSS, coherent detection is possible when channel estimates can be obtained via PSS detection.

In order to achieve a better performance of coherent detection for SSS by estimating the channel from PSS, multiple PSS sequences are used with a trade-off in PSS detection complexity. The different PSS sequences can enable improved channel estimation accuracy by relaxing the SFN effect that exists due to having a single PSS sequence from all cells. Thus, the aforementioned PSS/SSS design can support both coherent and non-coherent SSS detection. A UE needs to operate three parallel correlators for three different PSS sequences. However, the root indices 29 and 34 are a complex conjugate to each other and this enables a 'one-shot' correlator—two correlation outputs for u=29 and 34 can be obtained from correlation with either u=34 or u=29. The conjugate property holds in both time and frequency domains, for any sampling rate, with the central symmetry mapping in frequency domain. Therefore, only two parallel correlators are needed (one for u=25 and the other for u=29 (or u=34)).

There is a need to enhance the existing synchronization and cell search procedure for new communication systems such as 5G at least for the following reasons: (1) Beamforming support: In order to meet link budget requirements for operation in high carrier frequency bands, such as ones above 6 GHz, beamforming is required for transmissions by an eNB (and possibly also by a UE). Therefore, the aforementioned synchronization and cell search procedure needs to be updated for beamforming support. (2) Large bandwidth support: For operation with large system bandwidths, such as 100 MHz or above, a different sub-carrier spacing than the one for operation in the smaller system bandwidths can apply and such design needs to be considered for the synchronization and cell search procedure design. (3) Improved coverage: For some applications, such as ones associated with a requirement for increased coverage that can occur due to placements of UEs in locations experiencing a large path loss, the synchronization and cell search procedure needs to support enhanced coverage and increased repetitions of synchronization signals. (4) Improved performance: The synchronization performance of the aforementioned procedure is limited due to false alarms caused by the partitioning a cell ID into 1 PSS and 2 SSS, thereby leading to invalid combinations of PSS/SSS that cannot completely resolved by scrambling. A new synchronization procedure can be designed with improved false alarm performance. (5) Support for variable TTI: In current LTE Rel-13, the TTI duration is fixed. However, for 5G systems, the TTI is expected to be variable due to support for different sub-carrier spacings, low latency considerations etc. In this scenario with variable TTI, the mapping of the synchronization sequences and cell search within the frame needs to be specified.

Figure 6:
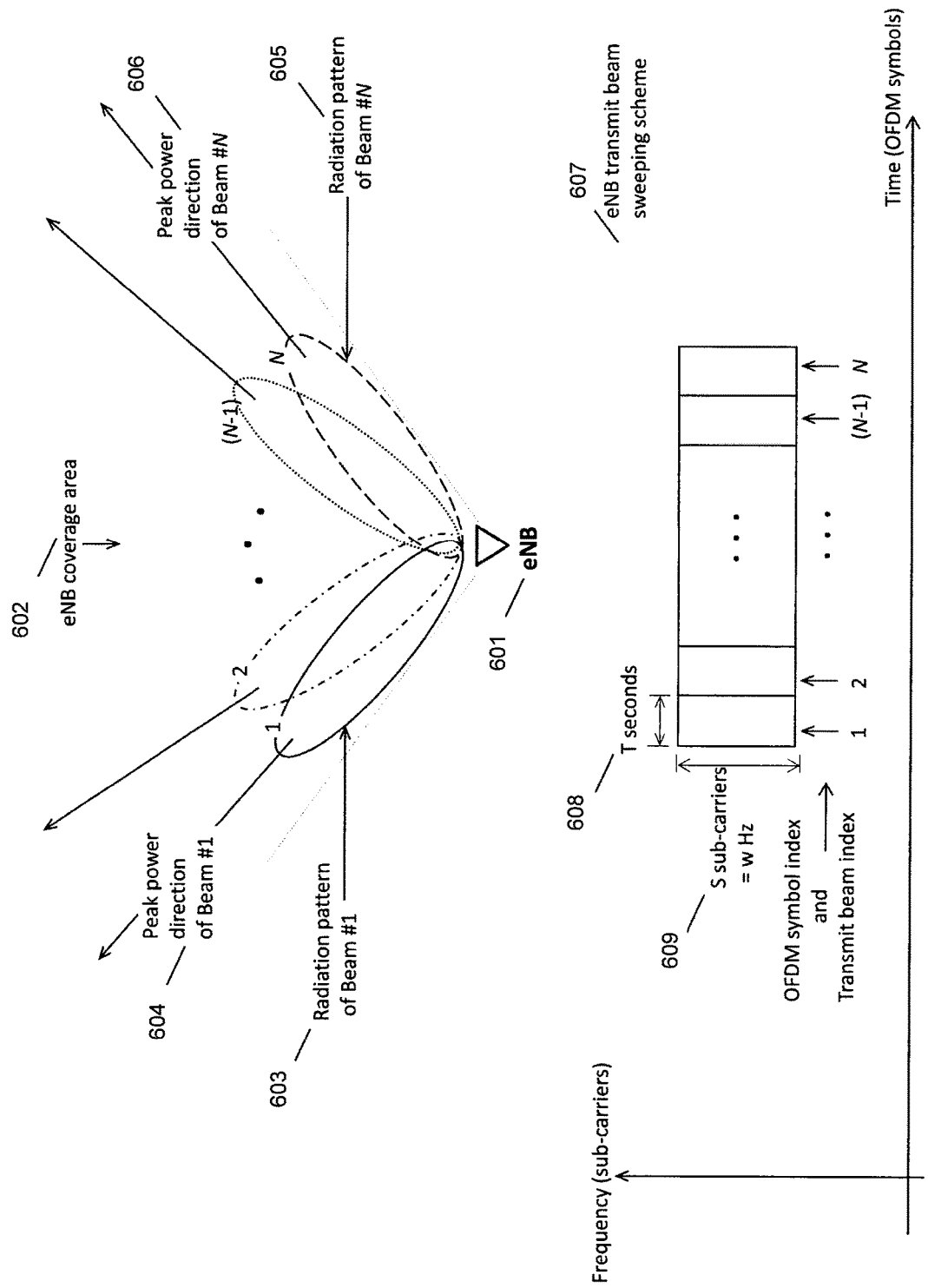
FIG. 6 illustrates an example transmission scheme that can be adopted by an eNB to utilize transmit beamforming according to embodiments of the present disclosure.

FIG. 6 illustrates an example transmission scheme that can be adopted by an eNB to utilize transmit beamforming to overcome the higher propagation losses, for a given propagation distance, that are observed at higher transmission carrier frequencies as compared to lower ones. As illustrated in FIG. 6, eNB 601 provides services to UEs in a certain geographical coverage area 602. The coverage area 602 could be an irregular shape in some implementations.

The eNB may form a transmit beam by applying suitable gains and phase settings to an antenna array. The transmit gain, i.e., the amplification of the power of the transmitted signal provided by a transmit beam, is typically inversely proportional to the width or area covered by the beam. At lower carrier frequencies, the more benign propagation losses may make it feasible for eNB 601 to provide coverage with a single transmit beam, i.e., ensure adequate received signal quality at all UE locations within the coverage area 602 via the usage of a single transmit beam. In other words, at lower transmit signal carrier frequencies, the transmit power amplification provided by the transmit beam with a width large enough to cover the coverage area 602 may be sufficient to overcome the propagation losses to ensure adequate received signal quality at all UE locations within the coverage area 602. However, at higher signal carrier frequencies, the transmit beam power amplification corresponding to the same coverage area may not be sufficient to overcome the higher propagation losses, resulting in a degradation of received signal quality at UE locations within the coverage area 602.

In order to overcome such a received signal quality degradation, the eNB 601 may form a number of transmit beams, each providing coverage over a region narrower than the overall coverage area 602, but providing the transmit power amplification sufficient to overcome the higher signal propagation loss due to the usage of higher transmit signal carrier frequencies. As illustrated in FIG. 6, eNB 601 forms a number N transmit beams, indexed from 1 to N. The transmit beam indexed as 1 has a radiation pattern. i.e., a relative coverage area 603, with a peak amplification gain, i.e., peak transmit power direction 604 within the overall coverage area 602. Each of the transmit beams has a different peak power direction; the beam indexed as N has a radiation pattern 605, with a peak transmit power direction 606 within the overall coverage area 602. The set of coverage regions enabled by the usage of the set of transmit beams indexed 1 to N, taken together, overlaps with the desired coverage area 602.

An example beam sweeping technique 607 may be utilized by eNB 301 to serve UEs over the entire coverage area 602 by utilizing the transmit beams 1 through N, wherein the eNB 601 may cycle through transmit beams while transmitting successive OFDM symbols. Each OFDM symbol spans T seconds 608 in time, and occupies S sub-carriers (SCs) 609 in frequency, equivalent to a bandwidth of W Hz. The eNB 601 may transmit OFDM symbol #1 via transmit beam #1, OFDM symbol #2 via transmit beam #2, and so on, transmitting OFDM symbols #N via transmit beam #N, and repeat the cycle for subsequent OFDM symbols. With this technique, the transmit beam corresponding to a particular OFDM symbol provides adequate received signal quality for the set of UEs within the coverage area of that beam; that set of UEs and the coverage area of the beam are sub-sets of the overall set of UEs requiring service and the overall coverage area 602, respectively. The N transmit beams used over the set of N consecutive OFDM symbols, each with a different coverage region within the overall coverage region 602, then provide coverage to the set of UEs in the overall coverage area 602. It may be recognized that instead of using a particular beam direction for the transmission of each OFDM symbol, the eNB may cycle through the beam directions while using the same beam direction for transmitting a set of OFDM symbols rather than a single OFDM symbol.

The legacy synchronization and cell search procedure as in LTE Rel 13, based on the usage of the PSS and SSS as described earlier in this disclosure, may also be employed in the context of an eNB employing a beam sweeping transmission technique as in 607 of FIG. 6.

Figure 7:
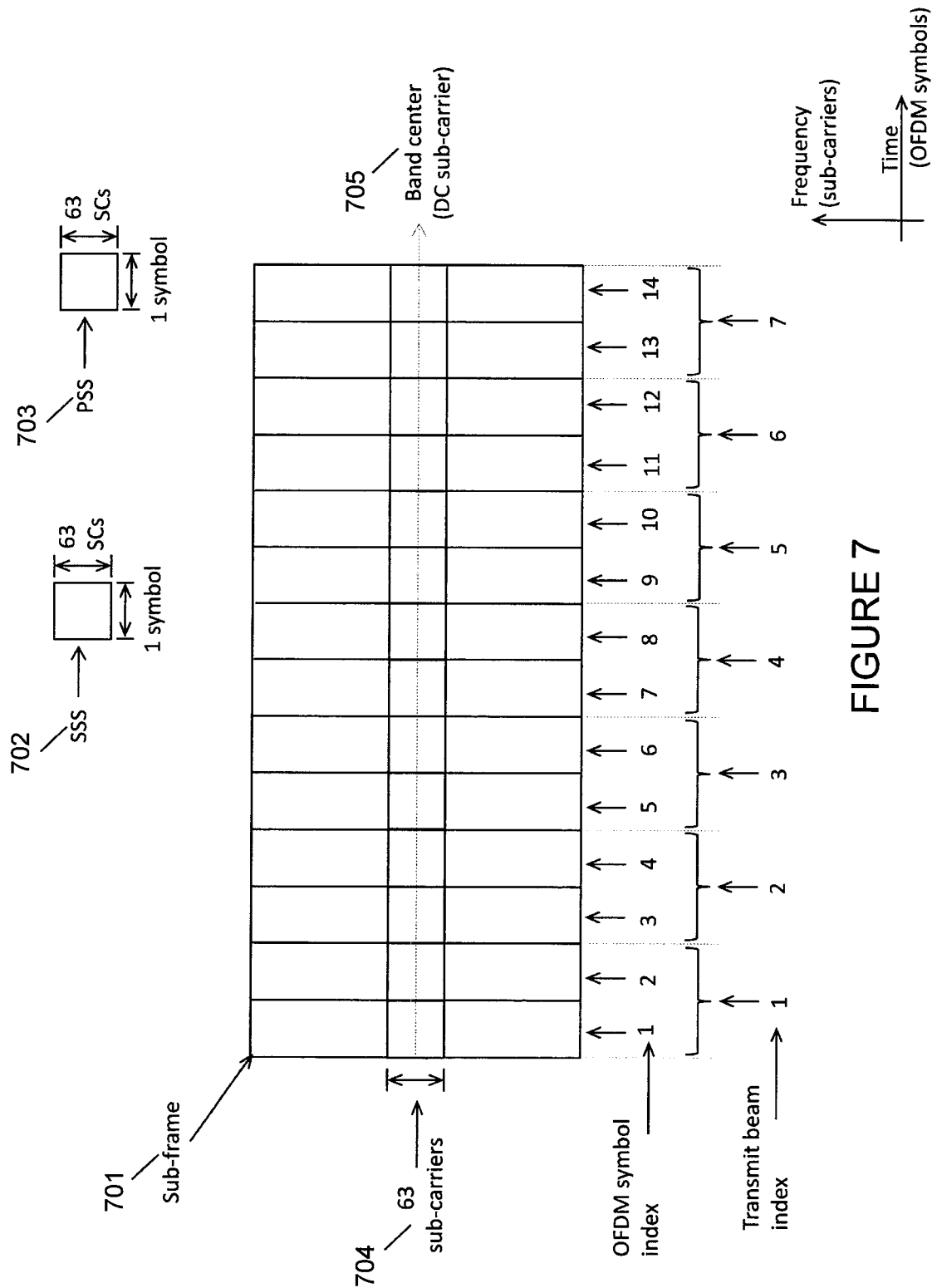
FIG. 7 illustrates an example of an extension of the PSS and SSS according to embodiments of the present disclosure.

FIG. 7 illustrates an example of an extension of the PSS and SSS according to embodiments of the present disclosure. As illustrated in FIG. 7, a sub-frame (SF) 701 includes an example 14 OFDM symbols, which is one of the configurations with respect to the number of OFDM symbols in a SF as per the legacy specifications. In this example, the eNB utilizes 7 transmit beams, which provide the required coverage for UEs served by the eNB, as described in the context of FIG. 6. As in the legacy system, the SSS 702 and PSS 703, respectively, are transmitted in the 63 sub-carriers (SCs) 704 located symmetrically around the DC SC 705 defining the center of the bandwidth occupied by the SF 701. As in the legacy system, the SSS and PSS are transmitted on consecutive symbols in time order. However, a different transmit beam is used for each set of SSS & PSS transmissions.

As illustrated in FIG. 7, the transmit beam indexed as 1 is used to transmit OFDM symbols indexed as 1 and 2, with the secondary synchronization signal (SSS) and primary synchronization signal (PSS) transmitted on symbols 1 and 2, respectively. UEs within the coverage region of transmit beam #1 can utilize the received samples corresponding to the PSS and SSS frequency occupancy regions to perform the legacy PSS and SSS based synchronization and cell id acquisition operations, as described earlier in this disclosure. The eNB then transmits the SSS and PSS via transmit beam #2 on symbols 3 and 4, respectively, and so on as illustrated in FIG. 7. Hence, by using the 7 transmit beams in turn over the 14 symbols in SF 701, the eNB transmits legacy SSS and PSS to UEs within the entire coverage area of the eNB, while ensuring adequate received SSS/PSS signal quality for any location in the eNB coverage area. As a result, UEs within the entire eNB coverage region may perform the legacy SSS & PSS-based synchronization and cell id acquisition operations.

In an example extension of the scheme in FIG. 7, an eNB with N transmit beams would require 2N OFDM symbols to complete the SSS/PSS transmissions, while ensuring via the beam sweeping scheme, described in the context of FIG. 7, that the received SSS/PSS signal quality is adequate to enable UE synchronization for any location in the eNB coverage area. It may be noted that such a beam sweeping based SSS/PSS transmissions may span a sequence of multiple SFs, and may occupy a portion of the OFDM symbols in the last SF in the sequence.

An issue which arises with such an example modification of the legacy synchronization and cell search procedure is as follows. In legacy systems, a single beam is utilized to transmit the SSS and PSS in consecutive OFDM symbols and periodically every 5 ms. Hence, with a knowledge of the periodicity of the PSS/SSS, a UE may utilize the PSS and SSS to acquire the OFDM symbol timing as well as to acquire the system frame timing, as explained in the context of Table 1. In the example modification as described above, however, the UE does not a-priori know the number of beams N being utilized by the eNB. The UE may acquire the OFDM symbol timing and cell id information from the SSS/SSS transmitted from a particular beam that covers the UE location within the overall coverage area of the eNB; however, the UE cannot further acquire the frame timing, as it does not know the time order of appearance of that beam within the set of OFDM symbols being utilized by the eNB for PSS/SSS transmissions. In other words, the UE, upon completing the PSS/SSS-based synchronization and cell id detection, does not know the positions of the OFDM symbols in which the PSS/SSS were transmitted within the SF, and hence, even with a knowledge of the number of OFDM symbols per SF, is unable to determine the SF and hence the frame boundaries.

Figure 8:
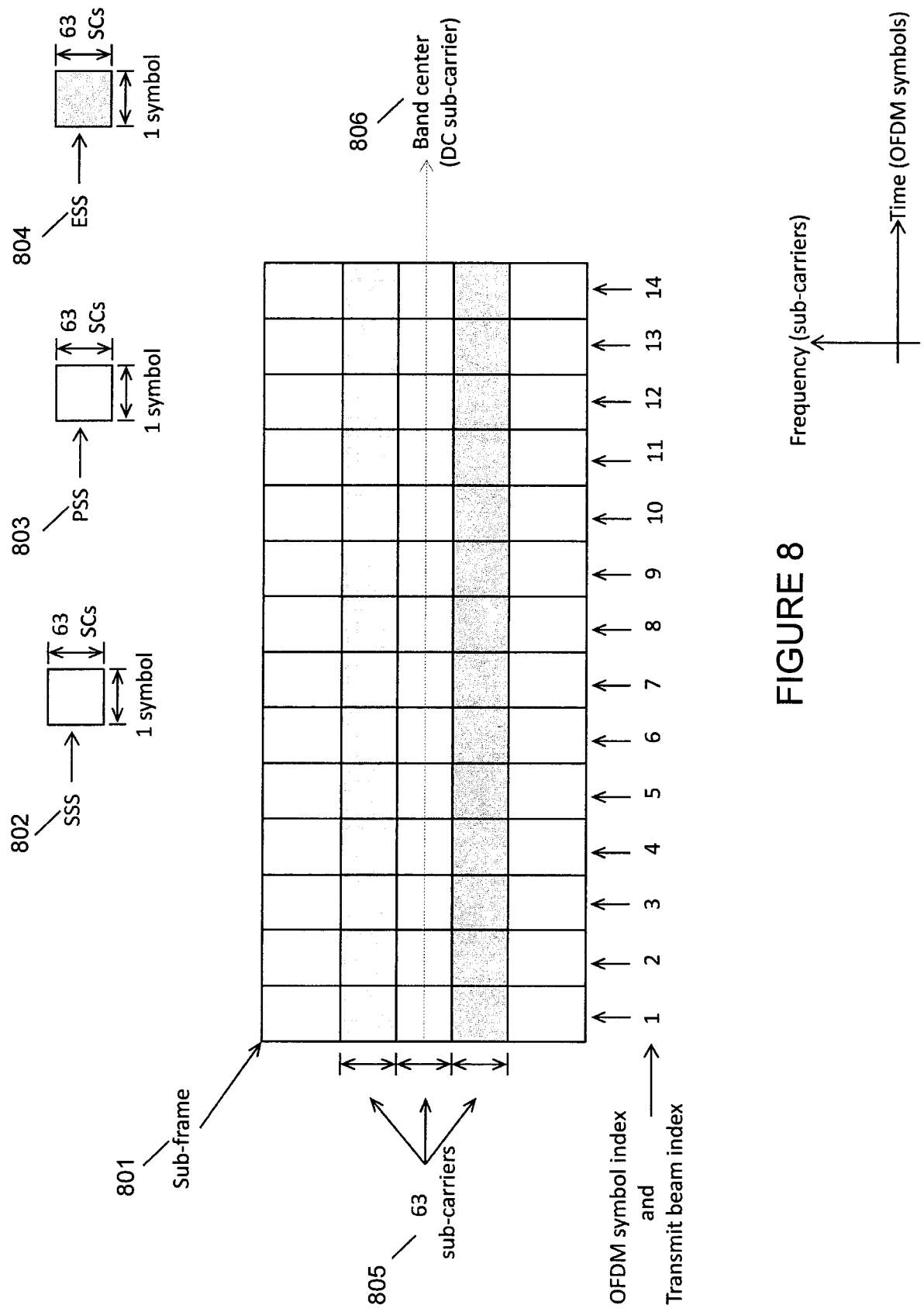
FIG. 8 illustrates another example of an extension of the PSS and SSS according to embodiments of the present disclosure.

FIG. 8 illustrates another example of an extension of the PSS and SSS to resolve the timing ambiguity issue described above according to embodiments of the present disclosure. As illustrates in FIG. 8, a SF 801 includes an example 14 OFDM symbols. In this example, the eNB utilizes 14 transmit beams, which provide the required coverage for UEs served by the eNB, as described in the context of FIG. 6. In addition to the PSS and SSS, another synchronization signal, referred to as the Extended Synchronization Signal (ESS) 804, is defined. As with the SSS and PSS 802 and 803 respectively, the ESS 804 occupies 63 SCs in a symbol. As shown in FIG. 8, the PSS, SSS and ESS are transmitted in the 63*3=189 SCs 805 located symmetrically around the DC SC 806 defining the center of the bandwidth occupied by the SF 801. The PSS occupies the center 63 SCs, and the SSS and ESS occupy the 63 SCs above and below the SC range of the PSS, respectively.

In each of the symbols in the SF 801, a sequence indicating the index of that OFDM symbol is mapped to the ESS SCs of that symbol. An example method of the generation of such sequences is as follows. A set of ZC sequences may be derived from a root ZC sequence by applying a set of cyclic shift (CS) values to the root ZC sequence. The system specifications may then define the mapping from each ZC sequence in the set to a particular OFDM symbol in the SF. In other words, the system specifications may define a mapping between the symbol index and the particular CS value to be used with respect to the root ZC sequence to derive the ZC sequence to be mapped to the ESS region of that symbol in the SF. In the particular example system with 14 symbols in the SF 501 and 14 transmit beams, 14 CS shifts of the root ZC sequence would be required to uniquely identify each symbol via the ZC sequence mapped to it.

The eNB uses a different transmit beam to transmit each of the 14 symbols in the SF, and hence cycles through all its 14 transmit beams over the 14 symbol duration of the SF 501. UEs in the coverage area of a particular transmit beam may then utilize the received samples corresponding to the PSS and SSS frequency occupancy regions in the symbol transmitted using that beam to perform the legacy synchronization and cell id acquisition operations. In addition, they may utilize the received samples corresponding to the ESS frequency occupancy region in the same symbol to derive the symbol index within the SF. The derivation of the symbol index may be achieved as follows, in the context of the CS-shift based example technique described above. Using the specification-based knowledge of the root ZC sequence, the UE may estimate the CS from the received samples corresponding to the ESS frequency occupancy region in the symbol. It may then select the CS value in the specifications closest to the estimated value, and from it arrive at the symbol index via the specification-defined mapping between CS and symbol index. Knowledge of the symbols index and the number of symbols in the SF then allows the UE to determine the SF and frame boundaries.

Further, as described in the context of FIG. 6, the beam sweeping by the eNB then ensures that UEs within the entire eNB coverage region may perform the legacy SSS &

PSS-based synchronization and cell id acquisition operations, and then utilize the ESS as described above to determine the SF boundaries.

An issue that may arise with such a technique is the requirement for a large number of CS values. In the multi-cell scenario, with a large number of cells utilizing such ZC sequences, the reliability of CS detection of a particular ZC sequence depends on the relative CS between it and other sequences transmitted at the same time. In general, for ZC sequences of a given length, larger relative CS vales can be ensured when the required number of CS smaller. The present disclosure provides some embodiments to reduce the number of CS values required for ESS operation.

A few terms that will be used in the disclosures of some of the embodiments of the present disclosure are now defined. The abbreviation TCSS will be used to refer to the Timing and Cell ID Synchronization Signal. The TCSS enables the UE to recover the OFDM symbol timing information as well as the cell id of the eNB transmitting the TCSS. Additionally, the TCSS may enable UE correction of the frequency offsets between the UE and eNB local oscillators. The TCSS may be comprised of two separate portions by way of being transmitted on physically different time and/or frequency resources. The first portion of the TCSS may enable UE recovery of the OFDM symbol timing information, while the second, possibly in combination with the first, may enable the cell id recovery. Both or either portions, singly or in combination, may enable the correction of frequency offsets or other impairments. The legacy synchronization channel design is an example of such a partition, with the PSS and SSS, respectively, comprising the first and second portions of the TCSS. The abbreviation ESS will be used to refer to the Extended Synchronization Signal. The ESS enables the UE to determine the index of the OFDM symbol or symbols in which it is transmitted. The UE first performs the symbol timing recovery and cell id determination, after which it determines the OFDM symbol index.

Embodiment Set 1

This set of embodiments discloses the placement of the TCSS and ESS in the transmitted OFDM symbols, as well as techniques whereby the identity, including the length, of sequences mapped to the ESS enable the UE to determine the index of the OFDM symbol in which it is transmitted.

Figure 9:
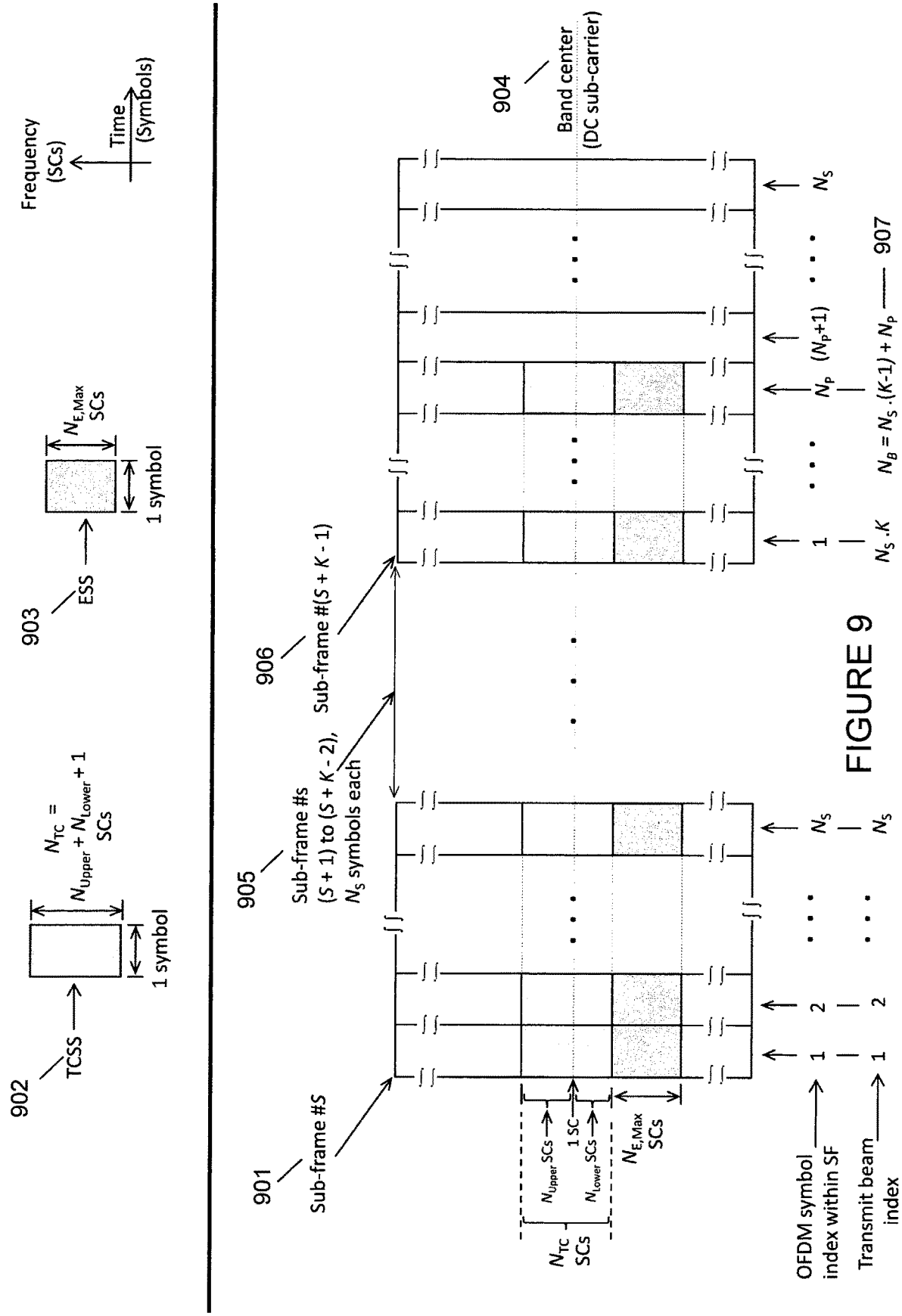
FIG. 9 illustrates an example placement of the timing and cell ID synchronization signal (TCSS) and ESS in the OFDM symbols according to embodiments of the present disclosure.

FIG. 9 illustrates an example placement of the TCSS and ESS in the transmitted OFDM symbols according to embodiments of the present disclosure. FIG. 9 shows K sequentially transmitted SFs 901, 905 and 906, numbered from S through (S+K−1), each including $N_S$ OFDM symbols, with all or a portion of these component OFDM symbols containing TCSS and ESS regions. Of these SFs, subframe 901 illustrates a SF, in the series of SFs transmitted by the eNB containing TCSS and ESS regions, with an index S. Each of the OFDM symbols in SF 901 contain TCSS 902 and ESS 903 regions. The TCSS region 902 occupies $N_{TC}=N_{Lower}+N_{Upper}+1$ SCs in each OFDM symbol it occurs in, where $N_{Lower}$ may be 0 or a positive integer, and likewise for $N_{Upper}$. As illustrated in FIG. 9, the $N_{TC}$ SCs that comprise the TCSS are arranged around the band center or DC SC 904, with $N_{Upper}$ of them arranged in SCs that have a higher index than the DC SC 904, and $N_{Lower}$ of them arranged in SCs that have a lower index than the DC SC 904.

In some embodiments, with $N_{TC}$ an odd number, the TCSS region may be arranged symmetrically around the DC SC 904, with $N_{Upper}=N_{Lower}=(N_{TC}-1)/2$. In some embodiments, with $N_{TC}$ an even number, $N_{Upper}$ may comprise one more SC than $N_{Lower}$, i.e., $N_{Upper}=N_{Lower}+1$, or, $N_{Lower}$ may comprise one more SC than $N_{Upper}$, i.e., $N_{Lower}=N_{Upper}+1$. In some embodiments, the TCSS and ESS regions, rather than being present starting from the first symbol in the first SF #S in the sequence of SFs, are present starting from a certain symbol #$N_A$, with $N_A \leq N_S$. In other words, the first occurrence of the TCSS and ESS regions may be in a symbol other than the $1^{st}$ symbol in the SF.

The ESS region 903 occupies a maximum of $N_{E,Max}$ SCs in each symbol of SF 901, adjacent to the TCSS region and with SC indices lower than the TCSS SC indices. While the maximum occupancy of the ESS in any symbol of SF 901 is $N_{E,Max}$ SCs, the actual occupancy may be smaller than $N_{E,Max}$ SCs. This is elaborated upon later in the description below.

As illustrated in FIG. 9, the eNB uses a different transmit beam to transmit each of the OFDM symbols containing the TCSS and ESS regions; the rationale for such a beam sweeping transmission scheme is as explained in the context of FIGS. 6 and 7 earlier in the disclosure. In the illustration in FIG. 9, the eNB has a certain number $N_B$ 907 transmit beams, where $N_B$ may be zero or a positive integer. The eNB utilizes all of the $N_S$ OFDM symbols of SF #S 901 through SF #(S+K−2) 905, and the first $N_P$ of the $N_S$ OFDM symbols of SF #(S+K−1) 906, so that $N_B=N_S \cdot (K-1)+N_P$.

A. It may be noted that given a value for the number of eNB transmit beams $N_B$, as well as the number of OFDM symbols $N_S$ per SF containing TCSS and ESS regions, K and $N_P$ may be calculated as $$K = \left\lfloor \frac{N_B}{N_S} \right\rfloor$$

and $N_P=N_B-N_S \cdot K$, where $\lfloor \alpha \rfloor$ represents the floor operation on the number α, yielding the largest integer lesser than or equaling α.

It may be noted that FIG. 9 specifically illustrates the case where the number of transmit beams $N_B$ is larger than the $N_S$, the number of OFDM symbols in a SF. In some embodiments, the number of transmit beams $N_B$ may be smaller than or equal to $N_S$. In embodiments where the number of transmit beams $N_B$ equals $N_S$, the formulae in (A) above yield K=1 and $N_P=0$. In other words, the eNB uses all the $N_S$ OFDM symbols in a single SF for the beam sweeping TCSS and ESS transmissions. In embodiments where the number of transmit beams $N_B$ is lesser than $N_S$, the formulae in (A) above yield K=0 and $N_P=N_B$. In other words, the eNB uses the first $N_B$ symbols out of the $N_S$ OFDM symbols in a single SF for the beam sweeping TCSS and ESS transmissions.

For each of the OFDM symbols containing an ESS region in FIG. 9, a sequence indicating the index of that OFDM symbol within the SF in which it appears is mapped to the ESS SCs of that symbol. The sequence associated with the ESS region in a particular symbol in a SF, therefore, indicates an integer between and including 1 and $N_S$ as the index of that OFDM symbol within that SF. In some embodiments, such a sequence, in addition to indicating the index of that OFDM symbol within the SF in which it appears, also indicates the index of that SF in the sequence of consecutive SFs containing symbols with ESS regions.

The techniques followed to map a sequence to the ESS region, as well as UE behavior with respect to the interpretation of the TCSS and ESS regions as well as other regions of the SF, are disclosed as follows. A particular sequence out of a family of sequences, all of the same length, may be mapped to the ESS region of a symbol with a particular index. In some embodiments, a family of ZC root sequences may be defined, along with a set of CS values for each ZC root sequence, with all the ZC root sequences having the same length. As explained earlier in the disclosure in the context of FIG. 8, a set of ZC sequences may be derived from a particular root ZC sequence in the family by applying the set of cyclic shift (CS) values, defined for that root sequence, to that root ZC sequence. Such derived ZC sequences may be mapped to the ESS region of the symbol with a particular index. Thus, a mapping may be defined, specifying, for each particular symbol index, the particular ZC root sequence and CS value to be used to derive the ZC sequence to be mapped onto the SCs of the ESS region in that symbol.

In some embodiments, the family of ZC root sequences consists of a single ZC root sequence. In some embodiments, the length of the ZC root sequences is the same as the number of SCs in the ESS region. In some embodiments, the length of the ZC root sequences is the closest prime number smaller than or equaling the number of SCs in the ESS region. In some embodiments, a set of pseudo-noise (PN) sequences, all of the same length, may be derived, with some suitable properties, such as the example property that the cross-correlation between any pair of sequences in the set is much smaller than the auto-correlation of either of them. A mapping may then be defined between the sequences in the set and the OFDM symbol indices in the SF, such that a first sequence with a first index in the set is mapped to an OFDM symbol with a first index, a second sequence with a second index in the set is mapped to an OFDM symbol with a second index, and so on.

For a sequence of length N with sequence values $\{a_1, a_2, \ldots, a_N\}$, the auto-correlation is defined as $$C_{Auto} = \frac{1}{N}\sum_{k=1}^{N} a_k \cdot a_k^*,$$

where $a_k^*$ represents the complex conjugate of $a_k$.

For another sequence of length N with sequence values $\{b_1, b_2, \ldots, b_N\}$, the cross-correlation between the two sequences is defined as $$C_{Cross} = \frac{1}{N}\sum_{k=1}^{N} a_k \cdot b_k^*.$$

In some embodiments, the length of the PN sequences is the same as the number of SCs in the ESS region. In some embodiments, the length of the PN sequences is one less than the number of SCs in the ESS region.

UE behavior in this case is elaborated upon the following. The behavior of a UE attempting system entry is as follows. Based on definitions in the system specifications, the UE is aware of the frequency locations of the TC SS and ESS regions, as well as the details, i.e., structure and generation rules, of the family of sequences mapped to the ESS region. In the context of the sequence example above, the UE is aware of the details of the family of ZC root sequences and the set of CS shifts that may be applied with respect to each of them. In the context of the sequence example above, the UE is aware of the details of the set of PN sequences.

In addition, for each OFDM symbol in the SF, or for each OFDM symbol in the set of sequential SFs containing the TCSS and ESS regions, the UE is aware of the particular sequence in the family mapped to the ESS region of that symbol. In the context of the sequence example above, for each OFDM symbol in the SF, the UE is aware of the particular ZC root sequence and CS value used to generate the ZC sequence mapped to the ESS region of that symbol. In the context of the sequence example above, the UE is aware of the index of the particular PN sequence mapped to the ESS region of that symbol.

The UE first determines symbol timing based on the received samples corresponding to the TCSS frequency occupancy region. This enables the UE to determine the received samples corresponding to the ESS frequency occupancy region in a symbol.

For the example case in (i) above wherein ZC sequences are used, an example UE operation to determine the index of that OFDM symbol is as follows. For each hypothesis about the ZC root sequence, the UE may estimate the CS from the received samples over the ESS frequency occupancy region in the symbol, and compare the estimated CS value to the set of allowed CS values defined for that root sequence. Over all the root sequence and CS value hypotheses, the UE may choose the root sequence and estimated CS value which provide the closest match to an allowed root sequence and CS value as the correct hypothesis. Using knowledge of the mapping between the ZC root sequence and CS value combinations to the symbol indices, the UE may determine the symbol index from the ZC root sequence and CS value hypothesized to be correct.

For the example, where PN sequences are used, an example UE operation to determine the index of that OFDM symbol is as follows. For each hypothesis about the index of the PN sequence, the UE may estimate a correlation metric based on the correlation between the received samples over the ESS frequency occupancy region in the symbol and the particular PN sequence corresponding to that index. The PN sequence index resulting in the highest value of such a metric may be selected as the correct hypothesis. Using knowledge of the mapping between the PN sequence indices and the symbol indices, the UE may determine the symbol index from the PN sequence index hypothesized to be correct.

The behavior of a UE, which has completed the system entry process and consequently determined the positions in time of the occurrence of sequences of SFs containing TCSS and ESS region as in 901, 905 and 906, is as follows. Via the definitions in the system specifications, such a UE is aware of the positions of the TCSS and ESS regions within the symbols of such SFs, and aware that those regions are reserved by the eNB for transmissions related to the synchronization functionality. Consequently, if a resource allocation made to the UE by the eNB includes the TCSS and ESS regions of some symbols, the UE interprets that resource allocation as not including those regions. Similarly, the eNB, when making resource allocations for transmissions to UEs in such SFs, may implicitly provision the parameters of the resource allocation, such as the number of information bits, as well as the modulation and coding scheme (MCS) to account for the non-usage of the sub-carriers in the TCSS and ESS regions in the SF. Such a process is referred to as rate-matching. The UE may process the received transmission from the eNB assuming such rate matching. As an example, if the eNB makes a resource allocation including symbol #2 in SF #S 601, both the eNB and the UE implicitly interpret that allocation as not including the TCSS and ESS regions in that symbol. In contrast, if the eNB makes a resource allocation including symbol #($N_P$+1) in SF #(S+K−1), both the eNB and the UE implicitly interpret that allocation as not including the entire symbol.

A sequence of a particular length may be mapped to the ESS region of a symbol with a particular index, by transmitting the sequence values on the SCs of the ESS region in that symbol; the lengths of sequences mapped to different symbols may be different. Since the ESS region 903 occupies a maximum of $N_{E,Max}$ SCs, sequences with length up-to length $N_{E,Max}$ may be used. A set of L sequence lengths, $l_1, l_2, \ldots, l_L$ may be defined, with each of the possible sequence lengths lesser than or equaling $N_{E,Max}$, i.e., $l_j \le N_{E,Max}$, $1 \le j \le L$. A mapping of the L sequence lengths $l_1, l_2, \ldots l_L$ to the ESS regions of each of the $N_S$ symbols of the SF may then be defined. As an example, with $L \le N_S$, a sequence with length $l_1$ may be mapped to symbol #1, a sequence with length $l_2$ to symbol #2, and so on till a mapping of a sequence of length $l_L$ to symbol #L, followed by a repeat of the mapping with a sequence with length $l_1$ mapped to symbol #(L+1).

In some embodiments, L=1, i.e., the length of the sequences mapped to the ESS region in any OFDM symbol in the SF is the same.

III. Some embodiments may combine the techniques revealed in (I) and (II) above. Hence, a particular sequence out of a first family of sequences, each of a certain first length, may be mapped to the ESS region of a symbol with a particular first index in the SF, whereas a particular sequence out of a second family of sequences, each of a certain second length which may differ from the first, may be mapped to the ESS region of a symbol with a second particular index different from the first.

The behavior of a UE attempting system entry is as in the description above, with the following additional details: based on definitions in the system specifications, the UE is aware of the details, i.e., structure, including the length, and generation rules, of the family of sequences mapped to the ESS region. When attempting to identify the OFDM symbol index, the UE includes the possible sequence lengths in the set of hypotheses. The behavior of a UE, which has completed the system entry process, is as in the description above.

In some embodiments, the mapping of sequences to the ESS regions in the symbols of the SF may be determined by an id, referred to as the ESS mapping id abbreviated as EMID, derived from the cell id CID of the cell of operation. Hence, a first eNB with a first CID may derive a first EMID, whereas a second eNB with a second CID different from the first may derive a second EMID, also different from the first. As a consequence, a first eNB with a first CID may utilize a particular first mapping of sequences to the ESS regions of the symbols in the SFs transmitted by it, as described in (I, II and III) above, whereas a second eNB with a second CID may utilize a second such mapping, possibly different from the first. In some embodiments, the EMID is derived from the CID by the formula EMID=c.modulo(CID, k), where c is a constant which could be 1, and k is the number of sectors in the cell. Here, modulo(x, y), where x and y are positive integers, is defined as modulo $$(x, y) = x - y \cdot \lfloor \frac{x}{y} \rfloor,$$

where $\lfloor a \rfloor$ represents the floor operation on the number a, yielding the largest integer lesser than or equaling a.

The behavior of a UE attempting system entry is as in the description above, with the following additional details:

Based on definitions in the system specifications, the UE is aware of the rule to calculate the EMID from the CID. In addition, for each EMID, the UE is aware of the details, i.e., structure and generation rules, of the family of sequences mapped to the ESS region for that EMID value.

Using the received samples corresponding to the TCSS frequency occupancy region, in addition to determining the symbol timing, the UE determines the CID (cell id) of the transmitting eNB as well. It then calculates the EMID corresponding to that CID, which enables the UE to determine the structure and generation rules of the family of sequences mapped to the ESS region for that EMID value.

When attempting to identify the OFDM symbol index, the UE restricts the hypotheses with respect to the sequences to search over to the set of sequences corresponding to the particular calculated EMID value.

The behavior of a UE, which has completed the system entry process, is as in the description above.

Such a scheme is advantageous in that it reduces the number of sequence property hypotheses the UE has to search over, thus lowering the UE complexity. Additionally, in a multi-cell scenario, such a scheme, by enabling neighboring cells to use different sequence mapping rules and hence different sequences on a particular symbol, improves the sequence detection reliability.

In some embodiments, beam sweeping is not employed, i.e., the number of beams $N_B$=1 in the context of FIG. 6. The techniques followed to map a sequence to the ESS region to indicate that the number of beams is one, as well as UE behavior with respect to the interpretation of the TCSS and ESS regions as well as other regions of the SF in such embodiments, are disclosed as follows. In some embodiments, the eNB transmits the TCSS region only in the first symbol in the first SF in the sequence of SFs designated for transmission of the TCSS and ESS regions, but does not map any of the pre-defined sequences to the ESS region. In this case, the behavior of a UE attempting system entry is as in the description above. The outcome of the behavior in earlier embodiments was the identification of the index of the symbol containing the ESS region with the detected sequence mapped to it. In this case, the UE fails to detect the ESS, since no ESS sequence was mapped to the ESS region. The UE infers that the eNB is employing a single transmit beam, and further infers that the detected TCSS corresponds to the first SF symbol, thus also determining the SF and frame boundaries.

The behavior of a UE, which has completed the system entry process, is as in the description with respect to (I)(iv) above, with the UE inferring in this case that only the TCSS region in the 1$^{st}$ symbol in the sequence of SFs designated for transmission of the TCSS and ESS regions is used for TCSS transmissions. In all resource allocations made to the UE and including that symbol, both the UE and eNB implicitly discount the TCSS region in that symbol from the allocation. In some embodiments, the eNB transmits the TCSS and ESS regions only in the first symbol in the first SF in the sequence of SFs designated for transmission of the TCSS and ESS regions. Furthermore, a special pre-defined sequence, indicating $N_B$=1, is mapped to the ESS region.

In this case, the behavior of a UE attempting system entry is as in the description above. In this case, detects the special sequence in the ESS region, indicating that the number of transmit beams $N_B=1$. The UE then infers that the TCSS and ESS correspond to the first symbol in the SF, thus also determining the SF and frame boundaries.

The behavior of a UE, which has completed the system entry process, is as in the description above. As indicated earlier, in some embodiments, the TCSS and ESS regions may be specified to be present in a certain symbol index #$N_A>1$, with $N_A \leq N_S$. In other words, the first occurrence of the TCSS and ESS regions may be in a symbol other than the $1^{st}$ symbol in the SF.

The next two embodiments disclose alternative placements of the ESS region in the OFDM symbols.

Embodiment Set 2

Figure 10:
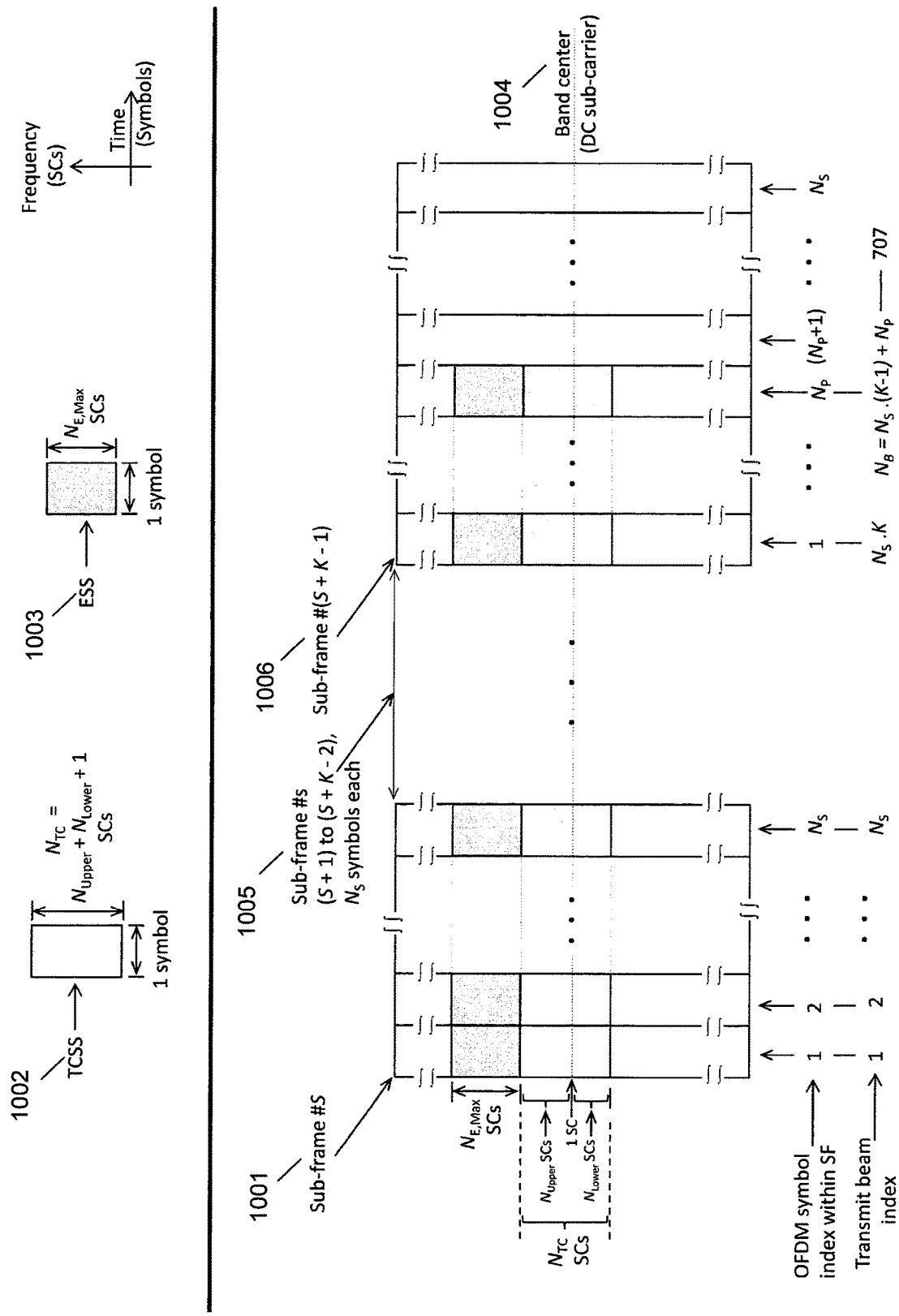
FIG. 10 illustrates an alternate placement of the ESS region in the OFDM symbols according to embodiments of the present disclosure.

With reference to the placement of the ESS regions as disclosed in Embodiment Set 1 and illustrated in FIG. 9, FIG. 10 illustrates an alternate placement of the ESS region in the OFDM symbols according to embodiments of the present disclosure. In this set of embodiments, the ESS region 1003 occupies a maximum of $N_{E,Max}$ SCs in each symbol of SF 701, adjacent to the TCSS region and with SC indices higher than the TCSS SC indices.

All of the other descriptions with respect to Embodiment Set 1 also apply to Embodiment Set 2.

Embodiment Set 3

Figure 11:
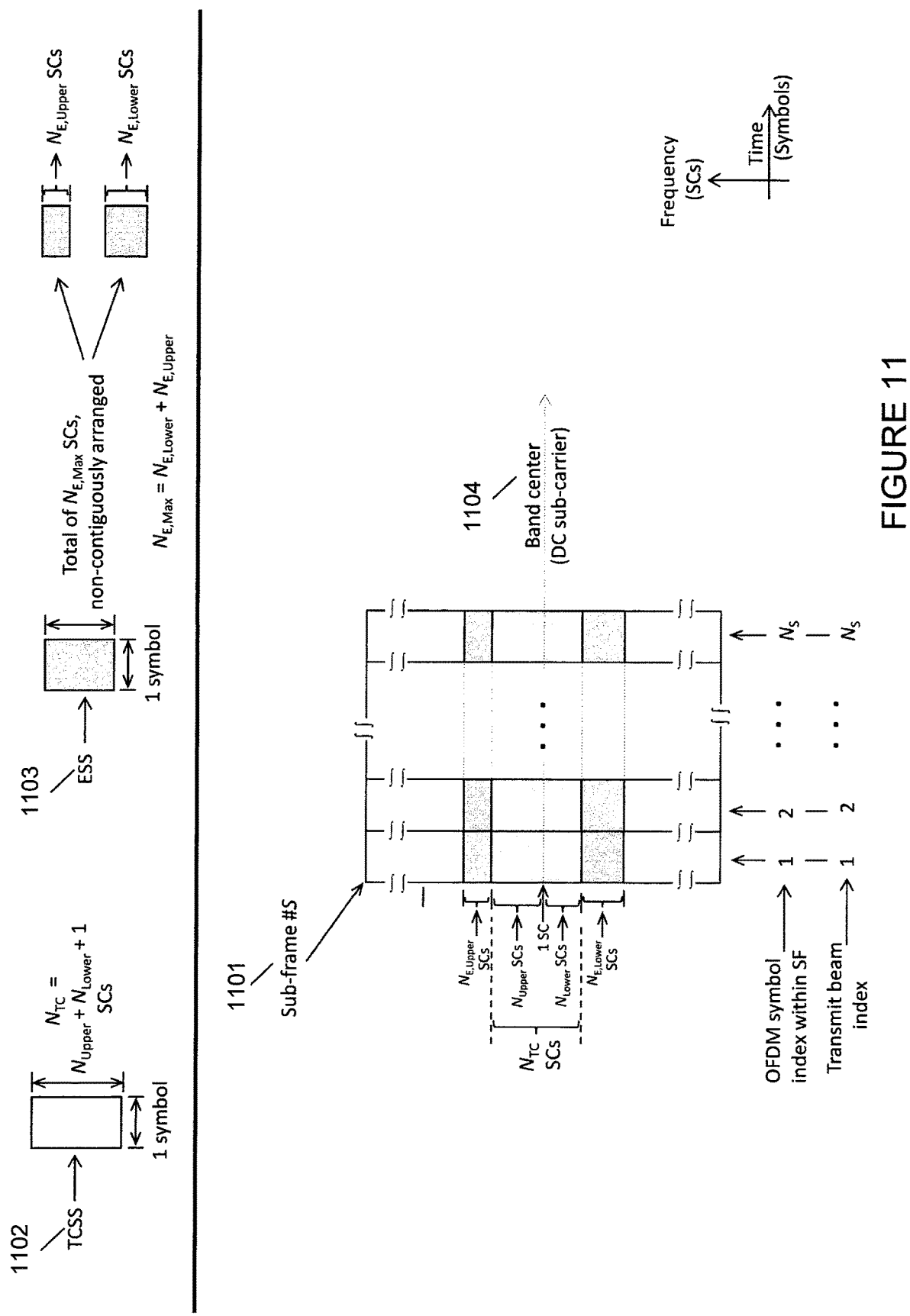
FIG. 11 illustrates another alternate placement of the extended synchronization signal (ESS) region according to embodiments of the present disclosure.

With reference to the placement of the ESS regions as disclosed in Embodiment Set 1 and illustrated in FIG. 9, FIG. 11 illustrates another alternate placement of the ESS region according to embodiments of the present disclosure. For the purpose of disclosure of the ESS placement, only the first SF 801, analogous to the first SF 601 in FIG. 9, is shown in FIG. 10; it is to be understood that as in FIG. 9, a sequence of K SFs is transmitted as well.

In this set of embodiments, the ESS region 803, including a maximum of $N_{E,Max}$ SCs, is partitioned into 2 portions including $N_{E,Upper}$ and $N_{E,Lower}$ contiguously placed SCs. As illustrated in FIG. 8, the $N_{E,Upper}$ SCs of the ESS occupy the region adjacent to the TCSS region and with SC indices higher than the TCSS region, whereas the $N_{E,Lower}$ SCs of the ESS occupy the region adjacent to the TCSS region and with SC indices lower than the TCSS region.

1. In some embodiments, with $N_{E,Max}$ an even number, the ESS region may be arranged symmetrically around the TCSS region, with $N_{E,Upper}=N_{E,Lower}=N_{E,Max}/2$.
2. In some embodiments, with $N_{E,Max}$ an odd number, $N_{E,Upper}$ may comprise one more SC than $N_{E,Lower}$, i.e., $N_{E,Upper}=N_{E,Lower}+1$, or, $N_{E,Lower}$ may comprise one more SC than $N_{E,Upper}$, i.e., $N_{E,Lower}=N_{E,Upper}+1$ All of the other descriptions with respect to Embodiment Set 1 also apply to Embodiment Set 3.

Embodiment Set 4

Figure 12:
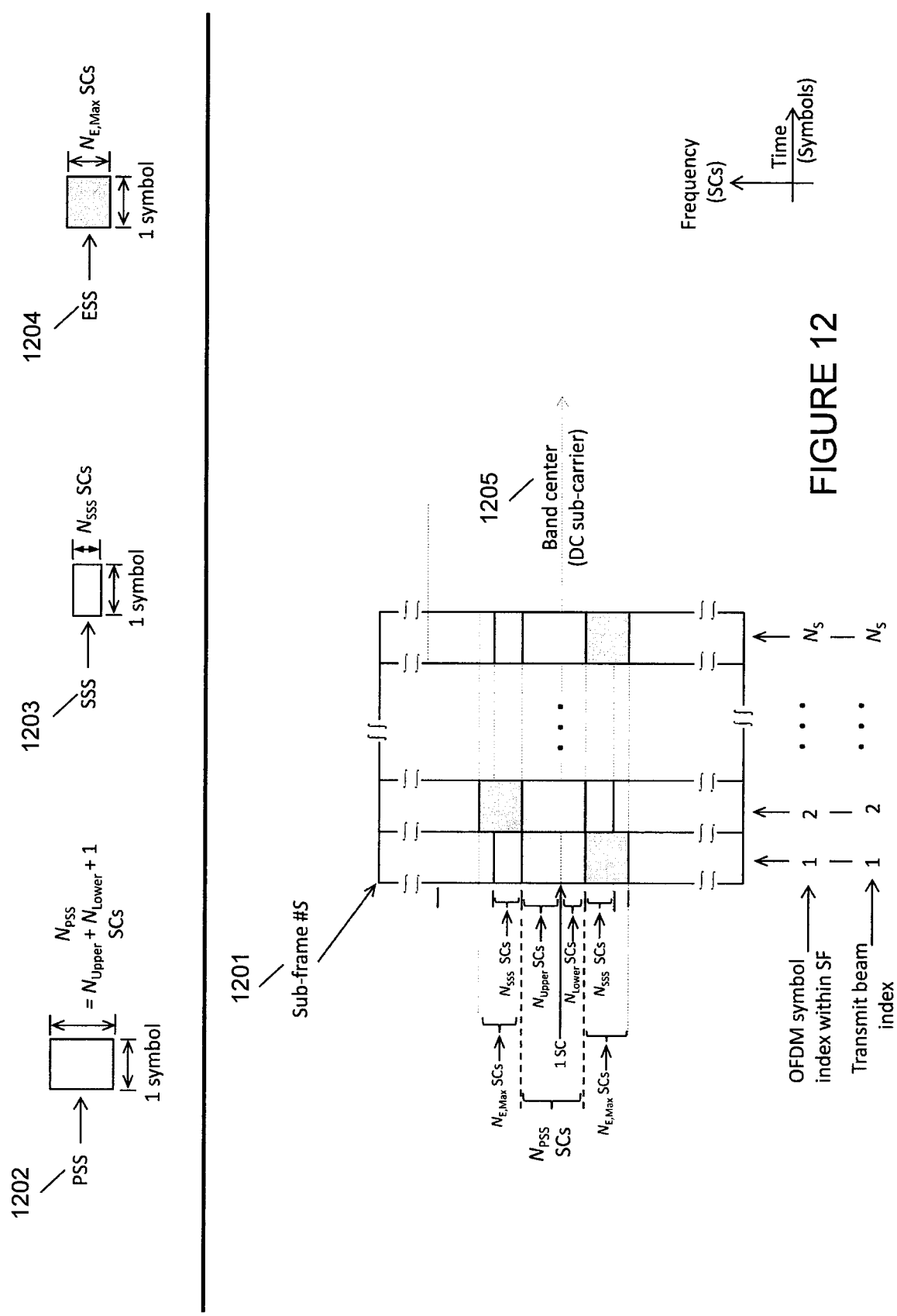
FIG. 12 illustrates another alternate placement of the ESS region according to embodiments of the present disclosure.

With reference to the placement of the ESS regions as disclosed in Embodiment Set 1 and illustrated in FIG. 9, FIG. 12 illustrates yet another alternate placement of the ESS region. In this set of embodiments, techniques for the placement of the ESS region with respect to the PSS and SSS portions of the TCSS is disclosed. For the purpose of disclosure of the PSS, SSS and ESS placement, only the first SF 1201, analogous to the first SF 901 in FIG. 9, is shown in FIG. 12; it is to be understood that as in FIG. 12, a sequence of K SFs is transmitted as well.

As illustrated in FIG. 12, the $N_{PSS}$ SCs that comprise the PSS 1202 are arranged around the band center or DC SC 1205, with $N_{Upper}$ of them arranged in SCs that have a higher index than the DC SC 1205, and $N_{Lower}$ of them arranged in SCs that have a lower index than the DC SC 1205.

The SSS region 1203 occupies $N_{SSS}$ SCs in a symbol, whereas the ESS region 1204 occupies a maximum of $N_{E,Max}$ SCs in a symbol of SF 1201.

In this set of embodiments, in any symbol, the SSS region may be adjacent to the PSS region and with SC indices lower than the PSS region while the ESS region is adjacent to the PSS region and with SC indices higher than the PSS region, or, the SSS region may be adjacent to the PSS region and with SC indices higher than the PSS region while the ESS region is adjacent to the PSS region and with SC indices lower than the PSS region. An example case is illustrated in FIG. 12, where, in the $1^{st}$ symbol of SF 1201, the SSS region is adjacent to the PSS region with SC indices higher than the PSS region while the ESS region is adjacent to the PSS region with lower SC indices than the PSS region, whereas the positions of the SSS and ESS regions are reversed in the $2^{nd}$ symbol of SF 1201.

A pre-defined mapping may be specified, defining the positions of the SSS and ESS in each SF symbol, either in terms of their frequency occupancy or relative to the PSS. The UE may utilize the knowledge of such a mapping, along with the detected sequence mapped onto the ESS region using the procedures described in the context of Embodiment Set 1, to determine the symbol index.

In some embodiments, the positions of the ESS and SSS regions alternate every symbol.

The behavior of a UE attempting system entry is as in the description above, with the following additional details.

Based on definitions in the system specifications, the UE is aware of the position of the PSS region and the possible frequency positions of the SSS and ESS regions in the symbols.

The UE determines symbol timing from the samples corresponding to the PSS frequency region. When attempting to determine the cell id, which may require the received samples corresponding to the SSS region, the UE searches over all possible locations of the SSS frequency region in the symbol.

When attempting to identify the OFDM symbol index, the UE searches over hypotheses with respect to the properties of the sequence mapped to the ESS region, over all possible ESS region locations in the symbol.

All of the other descriptions with respect to Embodiment Set 1 also apply to Embodiment Set 4.

The next set of embodiments discloses techniques to indicate the OFDM symbol index to the UE, without requiring the transmission of the ESS.

Embodiment Set 5

In this set of embodiments, a control channel, referred to as the Physical Broadcast Channel (PBCH), is utilized to indicate the OFDM symbol index to the UE. Unlike the ESS described in the previous embodiments, wherein a sequence mapped to the ESS SCs conveyed the symbol index, the bits in the information packet mapped to the PBCH convey that information to the UE.

Figure 13:
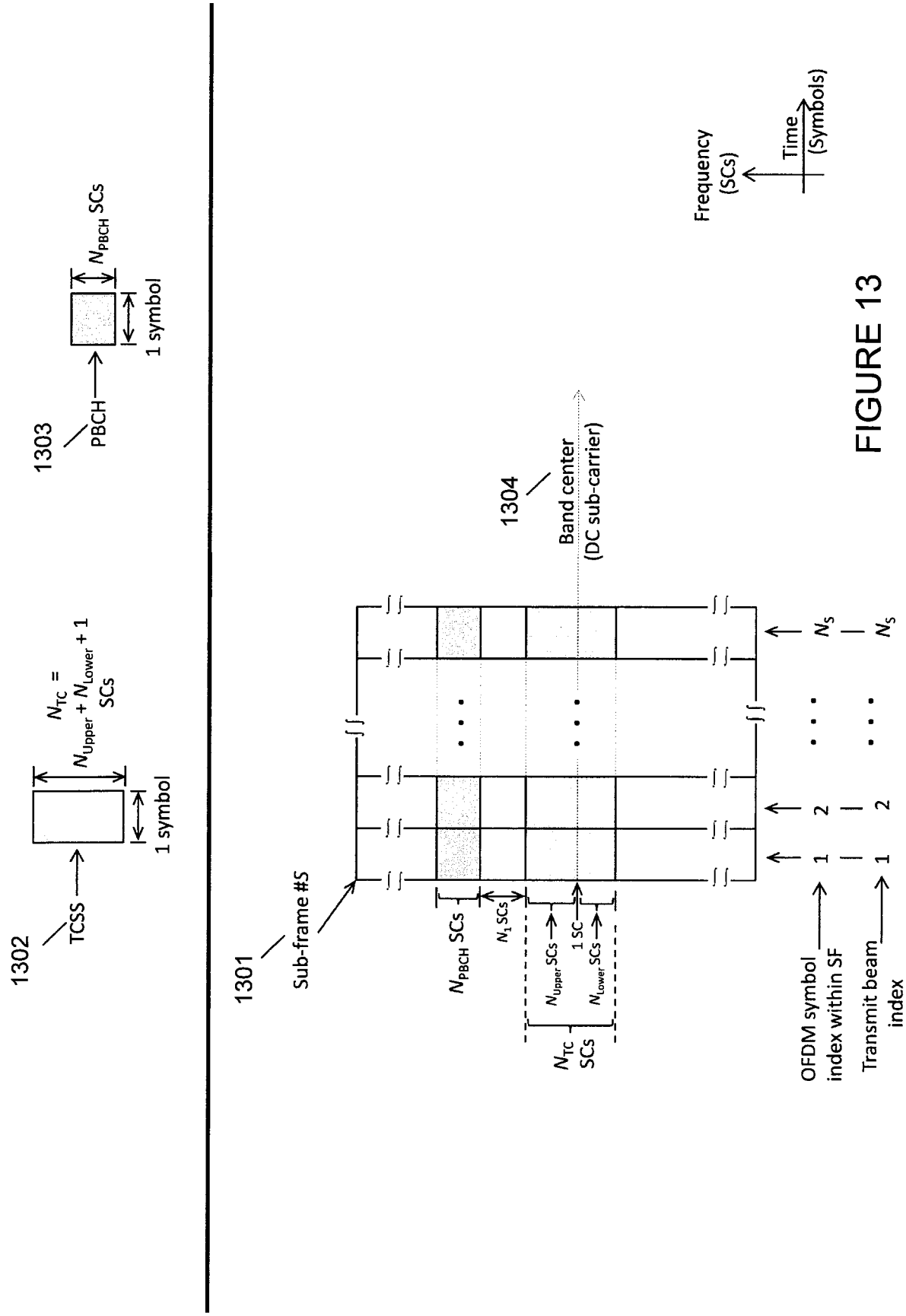
FIG. 13 illustrates another alternate placement of the ESS region according to embodiments of the present disclosure.

FIG. 13 illustrates the placement of the TCSS and the PBCH in this set of embodiments. For the purpose of disclosure of the TCSS and PBCH placements, only the first SF 1301, analogous to the first SF 901 in FIG. 9, is shown in FIG. 13; it is to be understood that as in FIG. 9, a sequence of K SFs is transmitted as well, with the same mapping between transmit beam index and OFDM symbol index within the SFs.

FIG. 13 illustrates the placement of the PBCH region 1303 in the OFDM symbols of SF 1301. The PBCH region 1303 includes $N_{PBCH}$ contiguous SCs in the SF symbols, placed $N_1$ SCs away from the TCSS region and with SC indices higher than the TCSS region. The PBCH region may include pilot or reference samples to enable channel estimation to aid in the demodulation and decoding of the information bits mapped to the PBCH region.

In some embodiments, the followings can be implemented.
1. The PBCH region may be placed $N_1$ SCs away from the TCSS region and with SC indices lower than the TCSS region.
2. $N_1$ may be 0, i.e., the PBCH region may be adjacent to the TCSS region.
3. The PBCH region may includes a pair of contiguous regions, the first of which is placed adjacent to the TCSS region and with SC indices higher than the TCSS region, while the second is placed adjacent to the TCSS region and with SC indices lower than the TCSS region.
4. Referring to the descriptions with respect to the previous embodiments wherein the symbols contain a contiguous ESS region, $N_1$ may be selected so that the PBCH region is adjacent to the ESS region.
5. Referring the descriptions with respect to previous embodiments wherein the symbols contain a pair of contiguous ESS regions placed above and adjacent to and below and adjacent to the TCSS region, the PBCH region may includes a pair of contiguous regions, the first of which is placed adjacent to the ESS region and with SC indices higher than the ESS and TCSS regions, while the second is placed adjacent to the TCSS region and with SC indices lower than the ESS and TCSS regions.

Figure 14:
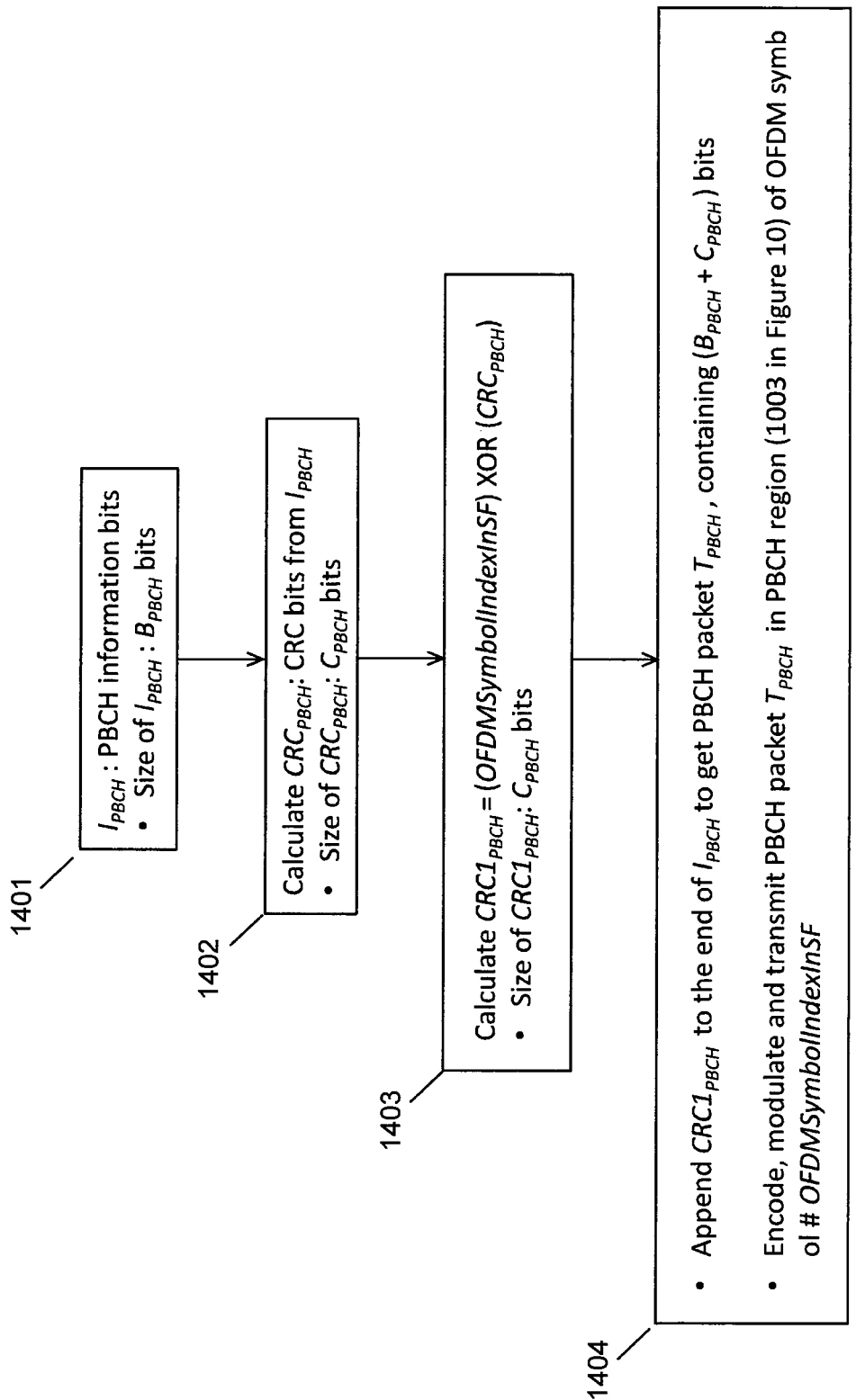
FIG. 14 illustrates example operations performed by the eNB to place a PBCH packet in the OFDM symbol according to embodiments of the present disclosure.

FIG. 14 illustrates the operations performed by the eNB to generate the PBCH packet, insert information regarding the OFDM symbol index, map it to the PBCH region and transmit it in the indicated OFDM symbol.
a. The eNB operates on the PBCH information bits in block 1401, referred to as $I_{PBCH}$, including $B_{PBCH}$ bits.
b. In block 1402, the eNB calculates a set of $C_{PBCH}$ cyclic redundancy check (CRC) bits, referred to as $CRC_{PBCH}$, from the PBCH information bits $I_{PBCH}$. Each of the $C_{PBCH}$ CRC bits is a particular linear combination, defined in the system specifications, of the $B_{PBCH}$ PBCH information bits.
c. To map the PBCH information bits onto the PBCH region in a symbol with index OFDMSymbolIndexInSF, the eNB in block 1403 performs a bit-wise exclusive OR (XOR) operation between OFDMSymbolIndexInSF, represented as a binary number, and the $C_{PBCH}$ CRC bits calculated in 1102, to yield the set of $C_{PBCH}$ bits referred to as $CRC1_{PBCH}$. The XOR operation has the following properties that are used in this embodiment. For a n-bit binary number A, and the n-bit all 0 binary number C, (A)XOR(C)=A. For a n-bit binary number A, (A)XOR(A)=C, i.e., the XOR operation between A and itself yields the n-bit all 0 value C. For a n-bit binary number B, (A)XOR(B)XOR(A)=B.
d. In block 1404, the eNB appends the $C_{PBCH}$ $CRC1_{PBCH}$ bits to the end of the $B_{PBCH}$ information bits $I_{PBCH}$, to get the PBCH packet referred to as $T_{PBCH}$, including $(B_{PBCH}+C_{PBCH})$ bits. These bits are then encoded, modulated and transmitted after mapping the modulation samples to the SCs of the PBCH region of the OFDM symbol with index OFDMSymbolIndexInSF.

Figure 15:
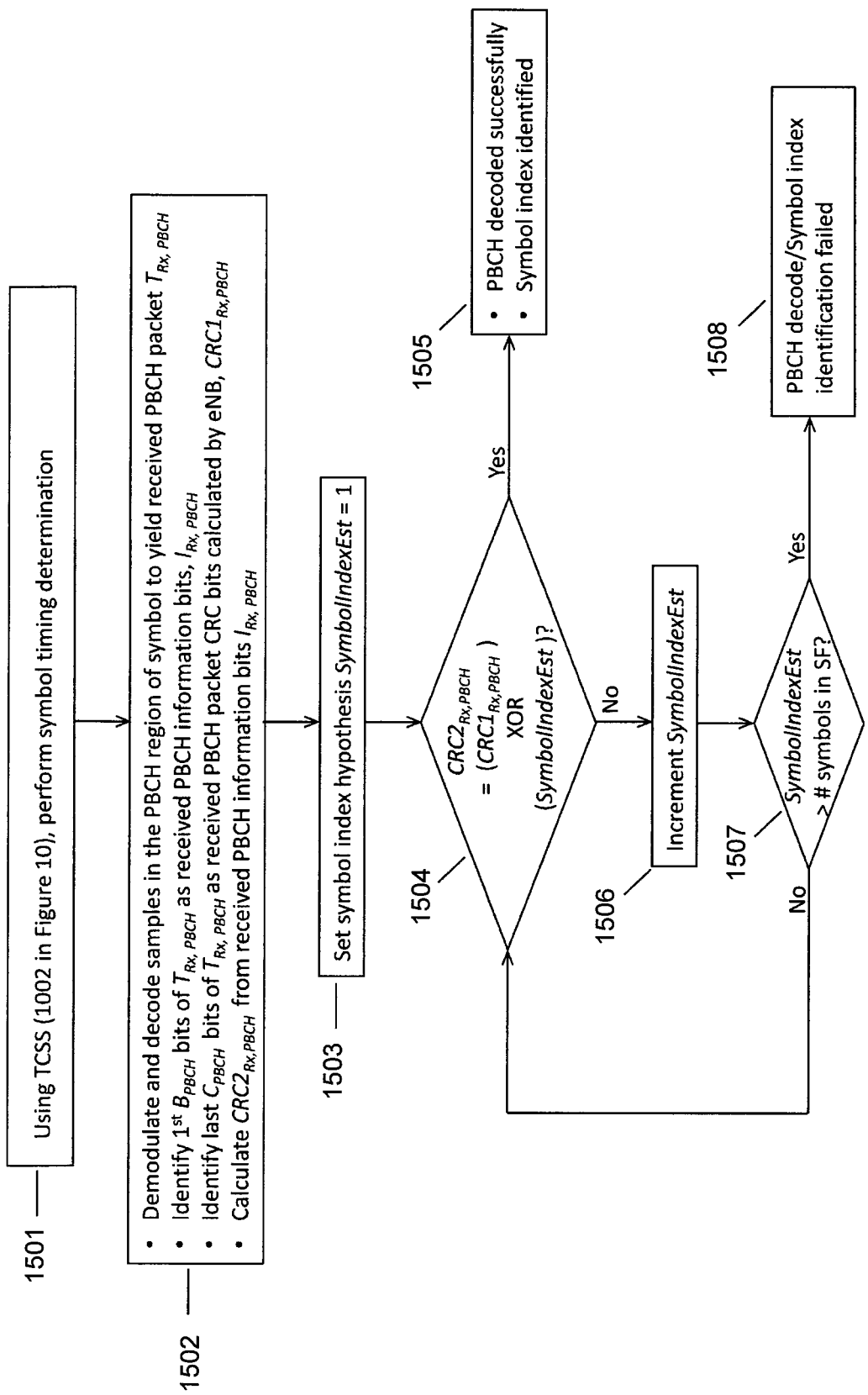
FIG. 15 illustrates example operations performed by the UE to recover PBCH information bits and the information regarding the OFDM symbol index according to embodiments of the present disclosure.

FIG. 15 illustrates the operations performed by the UE to recover the PBCH information bits, as well as recover the information regarding the OFDM symbol index. In block 1501, the UE recovers the OFDM symbol timing information utilizing the TCSS region 1002.

In block 1502, utilizing the symbol timing information from 1201, the UE demodulates and decodes the samples in the PBCH region to yield the received PBCH packet $T_{Rx,PBCH}$ including $(B_{PBCH}+C_{PBCH})$ bits. Of these, the first $B_{PBCH}$ bits correspond to the received version of the PBCH information bits $I_{PBCH}$, and are referred to as $I_{Rx,PBCH}$. The last $C_{PBCH}$ bits, referred to as $CRC1_{Rx,PBCH}$, correspond to the received version of $CRC1_{PBCH}$, calculated at the eNB.

At this point, the UE does not know if the PBCH decode was successful, i.e., if the set of received PBCH information bits in $I_{Rx,PBCH}$ are the same as the set of transmitted PBCH information bits $I_{PBCH}$. In order to determine if the PBCH decode was successful, the UE calculates the CRC, referred to as $CRC2_{Rx,PBCH}$, from the received PBCH information bits $T_{Rx,PBCH}$. It may be noted that if the decode was successful, $CRC2_{Rx,PBCH}$ should equal $CRC_{PBCH}$ calculated by the eNB from the PBCH information bits in Step B above. However, the UE only has available $CRC1_{Rx,PBCH}$, corresponding to the received version of $CRC_{PBCH}$ XORed with the OFDM symbol index. Making use of the XOR property above, then UE then XORs $CRC1_{Rx,PBCH}$ with all possible values of the OFDM symbol index, and checks if any of them match $CRC2_{Rx,PBCH}$. This is illustrated in 1503 to 1508.

If $CRC2_{Rx,PBCH}$ matches the output of the XOR operation between $CRC1_{Rx,PBCH}$ and a particular value of the OFDM symbol index as in 1504 and 1505, the PBCH decode is declared successful, and the symbol index is determined to be that particular value. If such a match does not occur for any of the $N_S$ values of OFDM symbol index in the SF, the PBCH decode is declared un-successful, and the UE re-attempts the PBCH reception.

It may be noted that in 1503, the starting value of the OFDM symbol index is selected as 1. This corresponds to the numbering convention illustrated in FIG. 13, whereby the symbol indices in the SF go from 1 to $N_S$. Alternatively, the symbol indices may go from 0 to $N_S-1$, in which case the starting value of the OFDM symbol index is selected as 0 in 1503.

In some alternative embodiments of this set, the following I to III can be implemented:
I. A portion of the PBCH information bits may convey the index of the OFDM symbol in which they are transmitted.
II. A portion of the PBCH information bits may convey the number of transmit beams being utilized by the eNB. a. In some embodiments, the PBCH information bits may convey whether a single transmit beam or more than one transmit beam are being utilized by the eNB.
III. The PBCH-based method may operate in conjunction with the ESS-based methods of symbol index determination.

Figure 16:
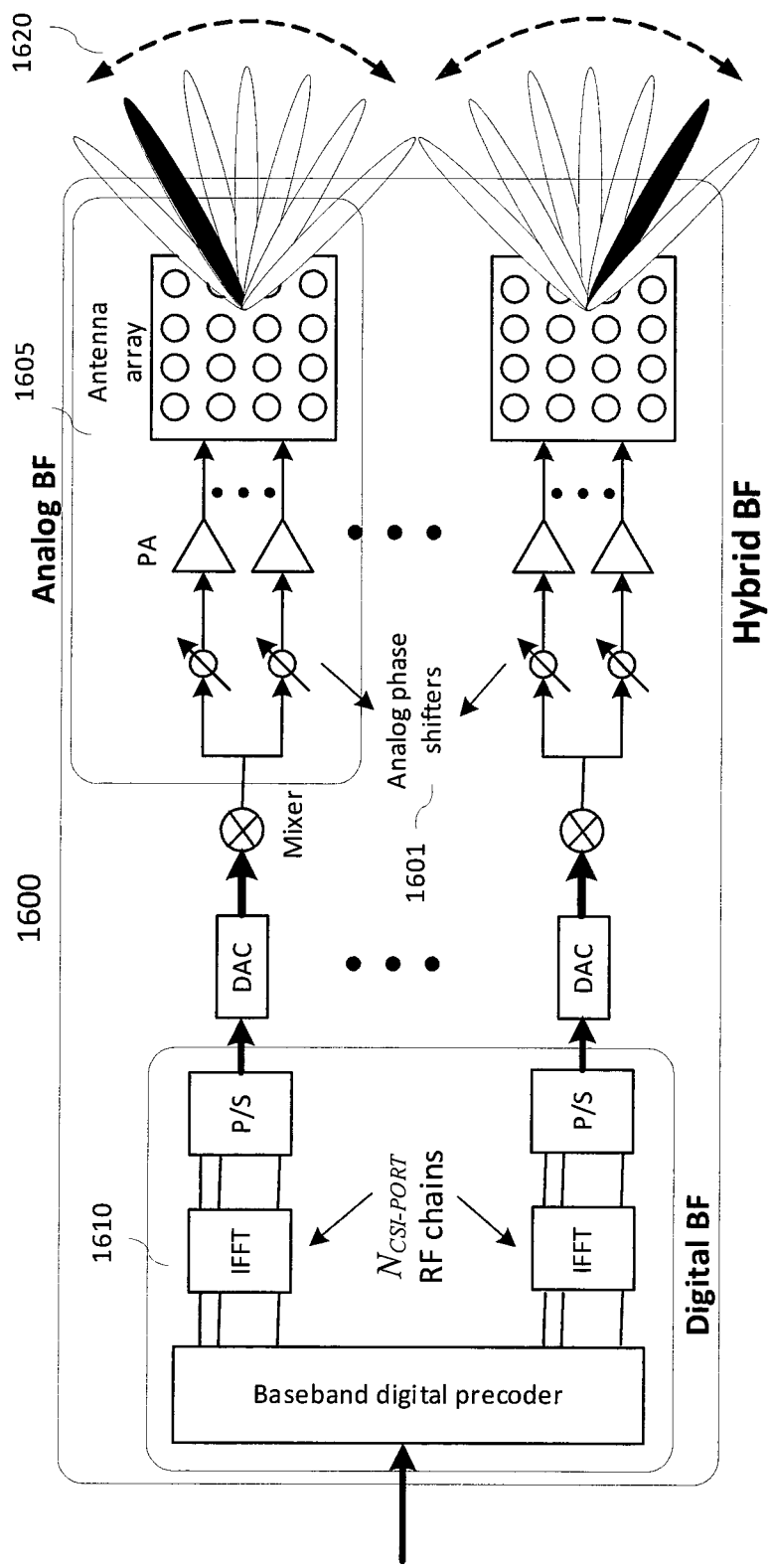
FIG. 16 illustrates an example transceiver with multiple antenna arrays to utilize one or multiple transmit beams according to embodiments of the present disclosure.

FIG. 16 illustrates a transceiver with multiple antenna arrays to utilize one or multiple transmit beams according to embodiments of the present disclosure.

For mmWave bands, the number of antenna elements can be large for a given form factor. However, the number of digitally chain to be limited due to hardware constraints (such as the feasibility to install a large number of ADCs/DACs at mmWave frequencies) as illustrated in FIG. 16. In this case, one digital chain is mapped onto a large number of antenna elements which can be controlled by a bank of analog phase shifters 1601. One digital chain can then correspond to one sub-array which produces a narrow analog beam through analog beamforming 1605. This analog beam can be configured to sweep across a wider range of angles (1620) by varying the phase shifter bank across symbols or subframes.

An eNB could utilize one or multiple transmit beams to cover the whole area of one cell. The eNB may form a transmit beam by applying suitable gains and phase settings to an antenna array. The transmit gain, i.e., the amplification of the power of the transmitted signal provided by a transmit beam, is typically inversely proportional to the width or area covered by the beam. At lower carrier frequencies, the more benign propagation losses may make it feasible for eNB to provide coverage with a single transmit beam, i.e., ensure adequate received signal quality at all UE locations within the coverage area via the usage of a single transmit beam. In other words, at lower transmit signal carrier frequencies, the transmit power amplification provided by the transmit beam with a width large enough to cover the area may be sufficient to overcome the propagation losses to ensure adequate received signal quality at all UE locations within the coverage area. However, at higher signal carrier frequencies, the transmit beam power amplification corresponding to the same coverage area may not be sufficient to overcome the higher propagation losses, resulting in a degradation of received signal quality at UE locations within the coverage area. In order to overcome such a received signal quality degradation, the eNB may form a number of transmit beams, each providing coverage over a region narrower than the overall coverage region, but providing the transmit power amplification sufficient to overcome the higher signal propagation loss due to the usage of higher transmit signal carrier frequencies.

At least the following are supported for NR in a frequency portion:
  a. A time interval X which can contain one or more of the following:
    i. DL transmission part,
    ii. Guard, and
    iii. UL transmission part.
  b. FFS which combinations are supported and whether they are indicated dynamically and/or semi-statically.
  c. Furthermore, the following is supported:
    i The DL transmission part of time interval X to contain downlink control information and/or downlink data transmissions and/or reference signals; and
    ii The UL transmission part of time interval X to contain uplink control information and/or uplink data transmissions and/or reference signals.
  d. FFS length(s) of time interval X.
  e. FFS: other characteristics of time interval X.
  f. Note: The usage of DL and UL does not preclude other deployment scenarios e.g., sidelink, backhaul, relay In some embodiments of the present disclosure, "a subframe" or "a time slot" is another name to refer to "a time interval X," or vice versa.

This paragraph discusses possible alternatives of unified frameworks, and the implications of the alternatives. The alternatives differ in whether and when UE recognizes a beamforming approach in initial access procedure. The information of beamforming approach can be conveyed as (1) a binary information (i.e., single-beam vs. multi-beam), or (2) alternatively in terms of the number of beams (N) used for the initial access signals—e.g., synchronization signals (SSs), system-information delivery channels, beam measurement signals (MRS) and RACH.

There are at least 3 alternative designs of the unified framework.

Alt 1. The beamforming approach is informed during the initial access procedure. The initial access procedure and signal mapping occurring after the approach indication can be individually optimized.

Alt 2. The beamforming approach is informed after the initial access procedure. The initial access procedure and signal mapping methods are identical but scalable with N. The UE behavior after the initial access can be optimized after the approach indication. For example, the UE can apply proper rate matching for data channels with the knowledge of N; and UL/DL control signaling can be individually optimized for single-beam vs. multi-beams.

Alt 3. UE is completely agnostic to the beamforming approach. The initial access procedure and signal mapping methods are identical. No information is signaled to UE regarding the approach.

The main difference between the multi-beam vs. the single-beam based approaches is whether a beam-sweeping is applied on the initial access signals or not. While beam sweeping is necessary for the multi-beam to provide basic coverage for the system, it could be just an unnecessary system overhead when the single-beam approach is used by the system. In addition, the beam sweeping mechanism is likely to introduce additional signaling components and mechanisms, which are also unnecessary for single-beam systems.

Hence, it will be beneficial if NR specifications allow (1) eNB to use the beam-sweeping only when necessary; and (2) UE to get indication of the information of whether beam-sweeping is used or not. The UE indication can be used for at least for data channel rate matching, and adapting the UL/DL signaling contents to the configured beamforming approach. Alt 3 does not seem to provide these features, and hence it is of less preferred to us. Both Alt 1 and Alt 2 can provide these features, and hence both can be further studied.

Figure 17:
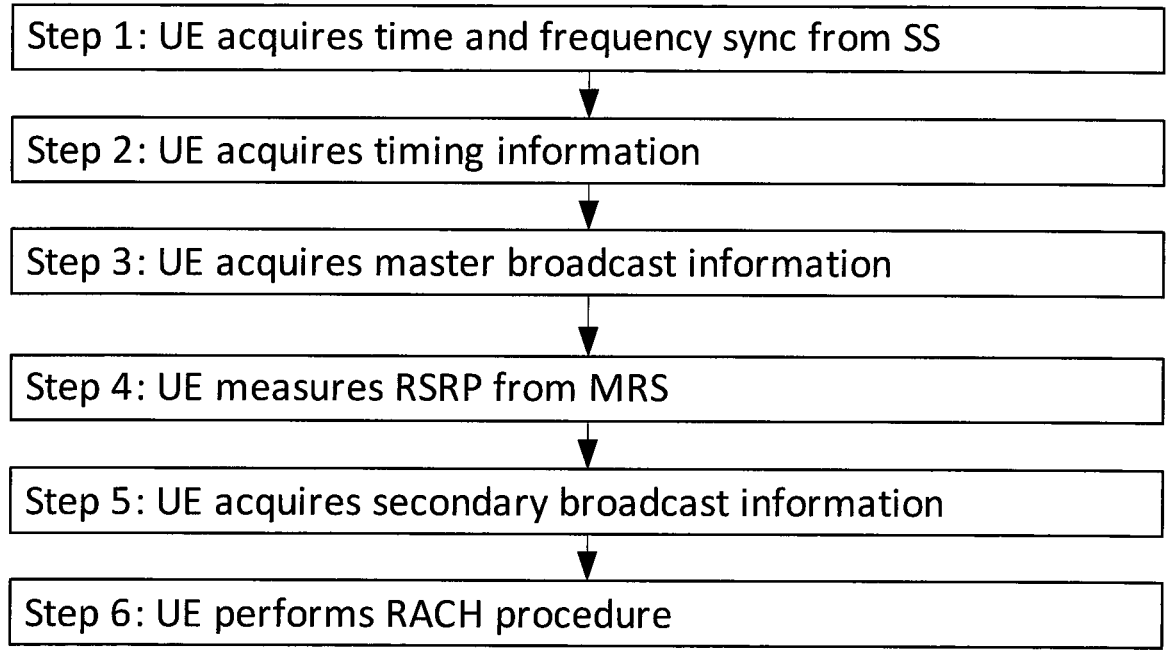
FIG. 17 illustrates an example high-level initial access procedure according to embodiments of the present disclosure.

In Alt 1, the beamforming approach is informed during the initial access process, and the information can be conveyed in any of those initial access steps illustrated in FIG. 17. the initial access process include: at Step 1, UE acquires time and frequency sync from SS; at Step 2, UE acquires timing information; at Step 3, UE acquires master broadcast information; at Step 4, UE measures RSRP from MRS; at Step 5, UE acquires secondary broadcast information; and at Step 6, UE performs RACH procedure.

Up until the indication, the mapping structure of the signals should be the same for the different beamforming approaches. The signals transmitted after the indication can be designed/optimized separately dependent upon the configured beamforming approach—the mapping structure and the signaling contents of the signals can be completely different. Design constraints specific for single-beam and multi-beam based approaches can be taken into account for these signal/signaling design during the initial access procedure.

In Alt 2, the beamforming approach is informed after the initial access process. In terms of initial access procedure, the single-beam approach is just a special case of the multi-beam approach. The system is scalable, in that N for the initial access signals can be differently selected by the network, e.g., to adapt the initial access signal overhead;

however the UE does not need to know whether the system is operating in multi-beam or single-beam based methods during the initial access procedure. The information conveyed in the later stage can be used for rate matching and UL/DL signaling contents determination, which can increase overall system throughput.

Based on the discussion above, Tables 1A summarizes pros and cons of these two alternatives.

TABLE 1A

Comparison of Alt 1 and Alt 2

| Alternatives | Pros. | Cons. |
| --- | --- | --- |
| Alt 1 | The system may be able to get benefits of individual optimizations of initial access procedure/signaling design for the multi-beam and the single-beam approaches. | The UE needs to implement multiple procedures for supporting both approaches. The UE complexity impact needs to be further studied, depending on when and how the UE is indicated the approach. |
| Alt 2 | UE needs to implement only a single initial-access procedure for supporting both approaches. | The system does not get benefits of individual optimizations of initial access procedure/signaling design for the multi-beam and the single-beam approaches. |

A wireless system may allow more than one operation modes to different types of UEs, or allow one of the multiple candidate operation modes in a common technical framework. Depending on a UE's detected operation mode, the UE is configured to interact differently with the network (or eNB); and the UE procedure is differently configured.

In some embodiments, an operation mode defines at least one of the following: How a UE should acquire synchronization and system information; what default transmission mode a UE should assume for the initial xPDSCH receptions; how a UE perform xPRACH procedure, and so on.

In some embodiments, a UE can be configured with one out of at least two operation modes: (1) beamformed operation mode (or alternatively multi-beam based approach) and (2) non-beamformed operation mode (or alternatively single-beam based approach).

In the present disclosure, "beamformed operation" may be used to refer to "multi-beam based approach" or vice versa; and "non-beamformed operation" may refer to "single-beam based approach" or vice versa.

In beamformed operation mode, eNB utilizes multiple ($N_B>1$) beams to transmit initial access signals (at least one of sync channels, broadcast channels, beam radio resource management (RRM) measurement signals, etc.), and each of those beams is able to cover a part of the coverage area of a cell. These initial access signals corresponding to a beam may be referred to an SS (synchronization signal) block, which may be transmitted in a given number of OFDM symbols. Hence, when the system transmits $N_B$ SS blocks, $N_B$ beams can be used for the initial access signals. In non-beamformed operation mode, eNB utilizes one ($N_B=1$) beam to transmit the initial access signal and this beam is able to cover the whole coverage area of the cell.

Some details of the UE's operation-mode-specific procedures are described below. It is noted that the procedural items may not be listed in time-sequential manner; in other words, an item with a higher number may happen earlier than an item with a lower number. Also, it is noted that UE may be configured to go through only a subset of the procedural items described below.

When beamformed operation mode is detected, UE follows at least one of the following procedures.

UE acquires synchronization (via sync channels/signals) and system information (via broadcast channels) assuming beam sweeping is performed at the eNB. In this case, the UE may detect sync signals with a same sequence ID or physical ID on multiple OFDM symbols in an initial-access subframe.

UE receives RRM measurement reference signals (MRS) on multiple time-frequency resources corresponding to the serving cell associated with the synchronization and the system information: The MRS resources can be explicitly configured; The beam ID for RSRP reporting is configured per antenna port per OFDM symbol.

UE performs RRM measurements on the multiple measurement reference signal (MRS) resources.

UE is configured in default transmission mode x for xPDSCH reception.

UE performs rate matching for xPDSCH/xPUSCH around the multiple initial-access signal resources (sync signals, broadcast channels, MRS resources, etc.) with beam sweeping in each initial-access subframe.

UE receives an indication (or configured in the higher layer) for multiple xPRACH resources for UE's beam sweeping.

UE performs RACH procedure on the configured xPRACH resources.

When non-beamformed-operation mode is detected, UE follows at least one of the following procedures.

UE acquires synchronization and system information on particular time-frequency resources. The OFDM symbol number and the subframe number for these time-frequency resources are statically configured.

UE identifies the resources of MRS for non-beamformed operation on a particular OFDM symbol(s) and then performs RRM measurement accordingly. The OFDM symbol number and the subframe number for the MRS are statically configured. The beam ID for RSRP reporting is configured per OFDM symbol.

UE is configured in default transmission mode y; and receives xPDSCH correspondingly.

UE performs rate matching for xPDSCH/xPUSCH around the particular initial-access signal resources (sync signals, broadcast channels, MRS resources, etc.).

UE receives an indication (or configured in the higher layer) for a single xPRACH resource for UE's non-beamformed operation.

UE performs RACH procedure on the configured xPRACH resource.

Initial-Access Signal Mapping Option 1: On Multiple Consecutive OFDM Symbols in an Initial-Access Subframe In some embodiments, the initial access signals are transmitted in one or multiple OFDM symbols in a subframe (or a time slot), wherein the subframe has $N_S$ consecutive OFDM symbols, indexed by l=0, ..., $N_S$–1.

In one method, the initial access signals transmitted from a serving cell on each OFDM symbol is self-contained, from which the UE is able to extract the full initial-access information, including the physical cell id, the OFDM symbol index and SF number.

A subframe in which initial access signals are mapped is called an initial-access subframe.

Figure 18:
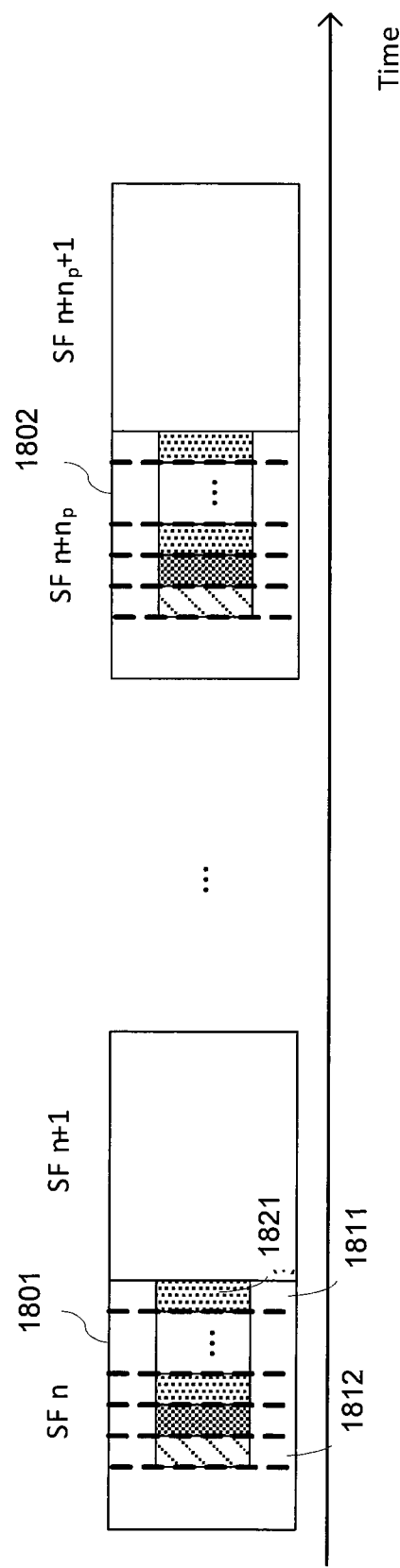
FIG. 18 illustrates example eNB's transmitting initial access signals in an initial-access subframe according to some embodiments of the present disclosure.

FIG. 18 illustrates eNB's transmitting initial access signals in an initial-access SF n 1801 according to some embodiments of the present disclosure.

In these embodiments, the initial access signals occupy a few OFDM symbols in each initial-access subframe. eNB transmits initial-access signals on one or multiple (l=1, ..., L, where L≤$N_S$ is a positive integer) consecutive OFDM symbols of the initial access subframe. The initial access signals on the different OFDM symbols may be beamformed with different beamforming (or antenna virtualization) vectors. One example use case is that eNB operating in the beamformed operation mode utilizes $N_B$ beams to cover the whole coverage area of one cell (i.e., beam sweeping). The eNB transmits the initial access signals on l OFDM symbols, each of which corresponds to one of these $N_B$ beams; in this case l=$N_B$.

In one method, the initial access signals occupy l consecutive OFDM symbols in an initial-access SF including the last OFDM symbol of the subframe. The eNB transmits initial access signal OFDM symbol $N_S$–l+1 1812 to the last OFDM symbol (which is OFDM symbol $N_S$–1) 1811 of SF n 1801. One benefit of this method is that the rest of the initial-access subframe can also be used for UL/DL control & data transmissions. In one example, the front portion of the initial-access subframe that is not used for mapping the initial access signals can be used for xPDCCH (physical downlink control channel) and xPDSCH (physical downlink shared channel) mapping; when UE knows the initial-access region boundary, the UE is configured to do rate match around the initial-access region for the xPDSCH reception scheduled with the xPDCCH transmitted in the initial-access subframe.

In some embodiments, initial access signals comprise at least one of first, second, and third signals and physical broadcast channels. In these embodiments, the first, the second and the third signals are denoted as x-IS, y-IS and z-IS, wherein IS denotes an initial-access signal; and the physical broadcast channels are denoted as xPBCH. For a serving cell, these signals can be mutually-orthogonally mapped onto the OFDM time-frequency resource grid. In one example, three orthogonal sets of consecutive subcarriers are used for mapping these different IS and xPBCH.

Beam ID Allocation Methods for BRS

In some embodiments, the initial access signals also include beam measurement reference signals (MRS or BMRS or BRS) for UE's RRM measurement, and they are also mapped on the l consecutive OFDM symbols in an initial-access SF. A number of antenna ports can be configured for the BMRS; for example, the number of antenna ports $N_P$ can be 1, 2, 4, 8. The UE measures reference signal received power (RSRP) from the BMRS on each antenna port on each OFDM symbol. An RRM report of the UE's contains information on RSRP with regards to a particular pair of a beam ID and an antenna port index, and hence it reports an RSRP value along with the associated pair of a beam ID and an antenna port index. The beam ID b of a BMRS on an OFDM symbol l on an antenna port p=0, 1, ..., $N_P$–1, in a subframe $n_s$ may be determined as a function of at least one of the sequence ID of the BMRS, the antenna port index p, the OFDM symbol index l and subframe number (i.e., $n_s$).

The total number of beam IDs is determined by at least one of the number of OFDM symbols per initial-access subframe to map the BMRS, L, and the number of configured antenna ports N.

In one method, the total number of beam IDs is $PLN_P$, wherein P=1, 2, 3, ..., and the BMRS is configured to be mapped on P subframes among $n_P$ consecutive subframes. In this case, a beam ID is allocated to each antenna port on each OFDM symbol.

In another method, the total number of beam IDs determined independently of the number of antenna ports, and is the same as PL, wherein P=1, 2, 3, ... and the BMRS is configured to be mapped on P subframes among $n_P$ consecutive subframes. In this case, a common beam ID is allocated to all the antenna ports in a same OFDM symbol, and a UE is allowed to derive RSRP and to select a beam based on the total power received on the all the antenna ports in the OFDM symbol.

In some embodiments, the number of OFDM symbols to map BMRS in each initial-access subframe, L, is explicitly indicated in xPBCH (or MIB) or ePBCH (or SIB) or via RRC signaling. Table 2 shows a few methods to map the states of the BMRS configuration field to the different values of L, when the field has either one or two bits. The example values for $N_S$ (total number of OFDM symbols of the initial-access subframe) include 6, 7, 8, 12, 14, 16; and the example values for offset x include 1, 2, 3 and 4.

TABLE 2

| | | State of the BMRS configuration field | | | |
|---|---|---|---|---|---|
| | | A first state (00 or 0) a first value | A second state (01 or 1) a second value | A third state (10) a third value | A fourth state (11) a fourth value |
| L | Method 1 (2 bit field) | 1 | $N_S$ – 2x | $N_S$ – x | $N_S$ |
| | Method 2 (2 bit field) | 1 | $N_S$ – 4x | $N_S$ – 2x | $N_S$ – x |
| | Method 3 (1 bit field) | 1 | Alt1: $N_S$ Alt2: $N_S$ – x | | |

In one method, the number of antenna ports $N_P$ is explicitly indicated in xPBCH (or MIB) or ePBCH (or SIB) or via RRC signaling. Below Table 3 shows a method to map the states of the antenna port configuration field to the different values of $N_P$, when the field has either one or two bits.

TABLE 3

| | | State of the antenna port configuration field | | | |
|---|---|---|---|---|---|
| | | A first state (00 or 0) a first value | A second state (01 or 1) a second value | A third state (10) a third value | A fourth state (11) a fourth value |
| L | Method 1 (2 bit field) | 1 | 2 | 4 | 8 |
| | Method 3 (1 bit field) | 1 | Alt 1: 2 Alt 2: 4 Alt 3: 8 | | |

When the BMRS is mapped on a single subframe within a frame comprising P consecutive subframes, a few example methods to determine the beam ID b are explained below. In the examples, p corresponds to an antenna port index.

Method 1: b=pL+l. This is when the BMRS is mapped on OFDM symbols l=0, . . . , L−1 of a subframe. In a special case in which only one antenna port is mapped or a common beam ID is allocated to all the antenna ports in a same OFDM symbol, b=l.

Method 2: b=pL+$N_S$−l. This is when the BMRS is mapped on OFDM symbols l=($N_S$−L), . . . , ($N_S$−1) of a subframe. In a special case in which only one antenna port is mapped or a common beam ID is allocated to all the antenna ports in a same OFDM symbol, b=$N_S$−l.

When the BMRS is mapped on two subframes (say subframes $n_s \in \{n_1, n_2\}$) within a frame comprising P consecutive subframes, define $$\tilde{n}_s = \begin{cases} 0, & \text{if } n_s = n_1 \\ 1, & \text{if } n_s = n_2 \end{cases} ;$$

and the beam ID b is determined by the followings.

b=$\tilde{n}_s N_P L$+pL+l . . . this is when the BMRS is mapped on OFDM symbols l=0, . . . , L−1 of a subframe; in this case beam IDs are assigned sequentially as the OFDM symbol number increases from l=0. In a special case in which only one antenna port is mapped or a common beam ID is allocated to all the antenna ports in a same OFDM symbol, b=$\tilde{n}_s$L+l.

b=$\tilde{n}_s N_P L$+pL+$N_S$−l . . . this is when the BMRS is mapped on OFDM symbols l=($N_S$−L), ($N_S$−1) of a subframe; in this case beam IDs are assigned sequentially as the OFDM symbol number decreases from l=$N_S$. In a special case in which only one antenna port is mapped, or a common beam ID is allocated to all the antenna ports in a same OFDM symbol, b=$\tilde{n}_s$L+$N_S$−l.

In a special case where $n_1$=0 and $n_2$=1: $\tilde{n}_s$=$n_s$.

In another special case where $n_1$=$n_{s,max}$−2 and $n_2$=0, wherein $n_{s,max}$ is the largest subframe number within the frame.

In some embodiments, the BRS measurement procedure is different configured dependent upon whether the UE is configured in multi-beam based approach or single-beam based following approaches.

When the UE is configured in multi-beam based operation mode: UE receives RRM measurement reference signals (MRS) on multiple time-frequency resources corresponding to the serving cell associated with the synchronization and the system information; the MRS resources can be explicitly configured; and the beam ID for RSRP reporting is configured per antenna port per OFDM symbol.

When the UE is configured in single-beam based operation mode: UE identifies the resources of MRS for non-beamformed operation on a particular OFDM symbol(s) and then performs RRM measurement accordingly. The OFDM symbol number and the subframe number for the MRS are statically configured; and the beam ID for RSRP reporting is configured per OFDM symbol, or a common beam ID is configured for the all the antenna ports in each OFDM symbol.

In some embodiments, one (or two, in one alternative) of the initial access signals 1821, say, x-IS (or x-IS and y-IS), transmitted in a first (or a first and a second) set of consecutive subcarriers on the OFDM symbols used for mapping the initial-access signals (e.g., 1811 and 1812), and the sequence for x-IS contains information on the physical cell ID of a serving cell. In this case, the x-IS (or x-IS and y-IS) sequences transmitted in these OFDM symbols are identical. On the other hand, another of the initial-access signals, say, z-IS, transmitted in another set of consecutive subcarriers on these OFDM symbols, and the sequence contains OFDM-symbol-index dependent information; in one example, scrambling initialization or cyclic shift of the ZC sequence of z-IS is determined dependent upon the OFDM symbol index as well as the physical cell ID. In this case, the z-IS sequences transmitted in these OFDM symbols are different. A UE firstly detects x-IS (or x-IS and y-IS) to figure out the physical cell ID, of a serving cell, and then detect z-IS to figure out the OFDM symbol index.

In some embodiments, the initial access signals are transmitted with periodicity $n_P$ subframes. As illustrated in FIG. 18, the initial access signal is transmitted in SF n 1801 and in SF n+$n_P$ 1802.

In some embodiments, the subframe index n, on which initial access signals are transmitted, is a constant. In this case, right after detecting the initial-access signals, a UE can identify the subframe index of a subframe on which initial access signals are transmitted, which is n.

Figure 19C:
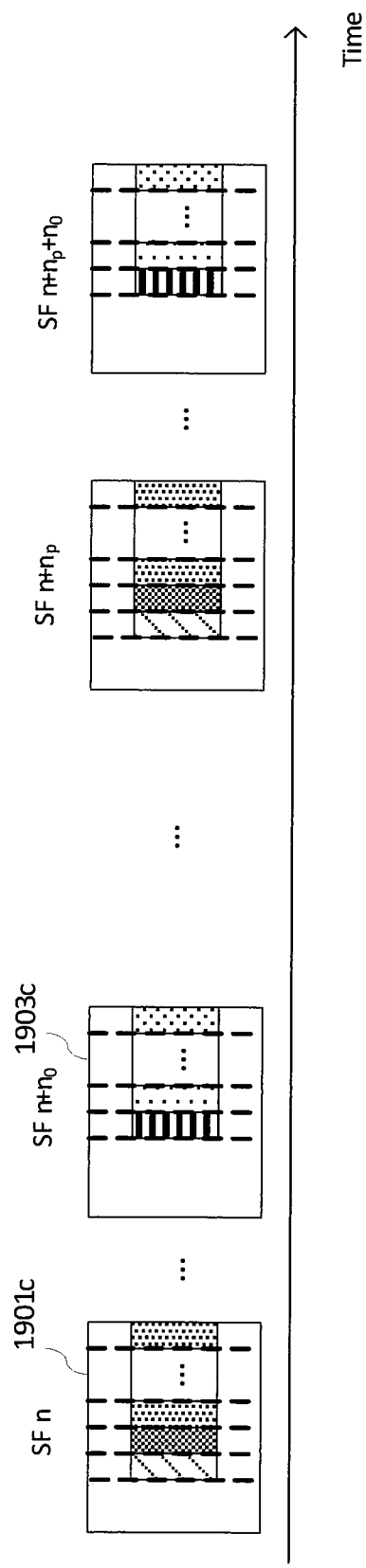

FIG. 19A to 19C illustrate embodiments in which initial-access signals are transmitted in two contiguous subframes according to some embodiments of the present disclosure.

As shown in FIG. 19A, an initial access signal is transmitted in the first OFDM symbols from the first OFDM symbol 1915a (l=0) to l-th OFDM symbol 1916a (l=l−1).

Initial-Access Signal Mapping Option 1': On Multiple Consecutive OFDM Symbols In Multiple Initial-Access Subframes In some embodiments, the initial-access signals are transmitted in two or more contiguous subframes. Although below examples are illustrated with two contiguous subframes only, one with ordinary skill of the arts can similarly construct the corresponding initial-access procedures when more than two contiguous subframes are used for mapping the initial-access signals, based on these illustrative examples.

FIG. 19B describes another example in which initial-access signals are transmitted in two contiguous subframes: a first subframe and a second subframe. In illustrative FIG. 19B, the first subframe 1901b corresponds to SF n and the second subframe 1903b corresponds to SF n+1. It is noted that similar embodiments can be constructed with SF n−1 as the second subframe 1903b, instead of SF n+1.

In some embodiments, eNB configures $N_B$=($l_1$+$l_2$) OFDM symbols for mapping the initial access signals, where $l_1$, $l_2$=1, . . . , L and L≤$N_S$ is a positive integer, representing the maximum number of OFDM symbols that can be used for mapping the initial-access signals in each SF. In the first subframe 1901b, the initial access signal is transmitted in the last $l_1$ OFDM symbols from OFDM symbol 1912b to the last OFDM symbol 1911b. In the second subframe 1903b, the initial access signal is transmitted in the last $l_2$ OFDM symbols from OFDM symbol 1914b to the last OFDM symbol 1913b. The mapping and transmission of the initial access signals are periodic (e.g., repeated) with periodicity $n_P$: as illustrated in FIG. 19B, the initial access signal is also transmitted in SF n+$n_P$ 1902b and SF n+$n_P$+1 1904b, if the first and the second subframes are subframes n and n+1.

In some of these embodiments, a UE can be configured to detect an OFDM symbol index and a subframe index by detecting an initial-access signal sequence of one of the initial access signals, say, zIS.

In one method, the initial-access signal sequence of zIS is constructed differently dependent upon a certain integer value, spanning 0, . . . , 2L−1. Possible ways to construct the signal sequence include (1) scrambling initialization is done differently dependent on the integer value; and (2) different ZC-sequence cyclic shift values are selected for the different integer values.

The integer value conveyed in an initial-access signal transmitted in the second SF 1903b is greater than L=$l_1$, and the value can be decomposed into L+$l_2$; on the other hand, the integer value conveyed in the initial-access signal transmitted in the first SF 1901b is $l_1$, which is less than L. Here, $l_1$=0, . . . , $l_1$−1; and $l_2$=0, . . . , $l_2$−1.

When a UE detect that the integer value of the initial-access signal is greater than L, then the UE identifies that the subframe index is corresponding to the second subframe (e.g., subframe n+1 or subframe n−1). Further, the UE decomposes the integer value into L+$l_2$, and identifies that a number to determine the OFDM symbol index carrying the initial-access signal is $l_2$. On the other hand, when the UE detects the integer value is $l_1$, which is less than or equal to L, then the UE identifies that the subframe index corresponds to the first subframe (i.e., subframe n); and the UE further identifies that a number to determine the OFDM symbol index carrying the initial-access signal is $l_1$. Two alternative ways (Alt 1 and Alt 2) of UE's determining the OFDM symbol number out of the numbers $l_1$ and $l_2$ to determine the OFDM symbol index are described below.

In a first alternative, Alt 1, the UE identifies that the OFDM symbol index is $(N_S-l_i)$, i.e., $l_i$-th OFDM symbol counting backwards from the last OFDM symbol of the i-th subframe, where i=1, 2, is carrying the initial-access signal.

In a second alternative, Alt 2, the UE identifies that the OFDM symbol index is $(N_S-L+l_i)$, i.e., $l_i$-th OFDM symbol counting forwards from the first OFDM symbol of the i-th subframe, where i=1, 2, is carrying the initial-access signal. In a special case, $N_S$=L.

In some embodiments, the initial-access signals are transmitted in two or more non-contiguous subframes. FIG. 19C shows an example in which initial-access signals are transmitted in two non-contiguous subframes: a first subframe 1901c and a second subframe 1903c are constructed with SF n and SF n+$n_0$, respectively.

In some embodiments, eNB can transmit/receive at least one of the DL/UL data and controls, i.e., xPDSCH, xPDCCH, xPUSCH and xPUCCH on the other OFDM symbols than the initial access signals are mapped in an initial-access subframe, as illustrated in FIG. 3c. The time-frequency resource corresponding to the OFDM symbols for which the initial access signals (sync channels and/or physical broadcast channels and/or beamforming measurement related reference signals) are mapped is called initial-access signaling region.

A signaling can be introduced so that a UE can identify the set and/or the number of OFDM symbols that are available for data and control information reception/transmission; then the UE is configured to do a rate matching for the data/control signal transmission accordingly. In some embodiments, the signaling to facilitate UE's rate matching (or to let UE know the initial-access signaling region) can be conveyed according to the followings:

via RRC signaling.
via a dynamic DCI signaling on xPDCCH. One example is that the DCI indicates the starting and ending symbol index of xPDSCH or xPUSCH region. Another example is that the DCI indicates the ending symbol index of xPDSCH or xPUSCH region and the xPDSCH or xPUSCH region starts immediately after the xPDCCH.
on a system information block (SIB).
on the MIB on the xPBCH.
The information is jointly coded with other information (e.g., physical cell ID, OFDM symbol number, etc) on the initial-access signal.

In some embodiments, the data/control region boundary indication (or initial-access signaling region) may comprise an integer value. Examples are shown below:

Example 1: The integer value corresponds to the last OFDM symbol index on the initial-access subframe, on which the data/control are mapped.

Example 2. The integer value corresponds to the number of OFDM symbols, $l_i$, which are used for mapping the initial access signals in initial-access subframe i (e.g., SF n and SF n+1). In this case, the UE can also be configured with a maximum number of OFDM symbols, L, which can be used for initial access signals in an initial access subframe. In this case, $l_i$=1, . . . , L, When the last f, consecutive OFDM symbols on the initial-access subframe are used for mapping the initial-access signals, the PDSCH should rate match around the last f, OFDM symbols.

Figure 20:
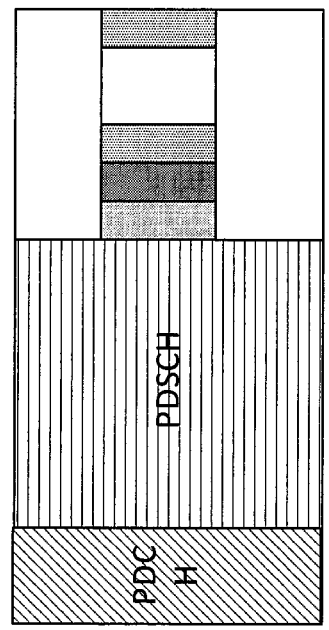
FIG. 20 illustrates an example of utilizing the initial-access subframe for data and control messages according to some embodiments of the present disclosure.

FIG. 20 illustrates an embodiment in which data and control messages are mapped to OFDM symbols that are not mapped with initial access signals in an initial access subframe according to some embodiments of the present disclosure.

When f, consecutive OFDM symbols starting from OFDM symbol $(N_S-L)$ on the initial-access subframe are used for mapping the initial access signals, the OFDM symbols 0, . . . , $(N_S-L-1)$, i.e., the front left-over portion of an initial-access subframe can be used for downlink control and/or data (e.g., xPDCCH and/or xPDSCH) mapping, and the OFDM symbols $(N_S-L-L_1+1)$, . . . , $N_S-1$, i.e., the end left-over portion of an initial-access subframe can be used for uplink control and/or data (e.g., xPUCCH and/or xPUSCH) transmission.

In some embodiments, the OFDM symbol index on which initial access signals are detected (or mapped) conveys a 1-bit information on the initial operation mode.

In one method: when a UE detects the initial access signal on a particular OFDM symbol in an initial-access subframe, the UE is further configured to operate according to a non-beamformed operation mode; on the other hand, when the UE the initial access signal on another OFDM symbol than the particular OFDM symbol, the UE is further configured to operate according to a beamformed operation mode. In addition, when configured with the non-beam-formed operation mode, the UE is further configured to perform the xPDSCH/xPUSCH rate matching in the initial-access subframe around the particular OFDM symbol; on the other hand when configured with the beamformed operation mode, the UE is further configured to rate match around the initial-access signaling region, the size of which may be separately indicated.

Figure 21:
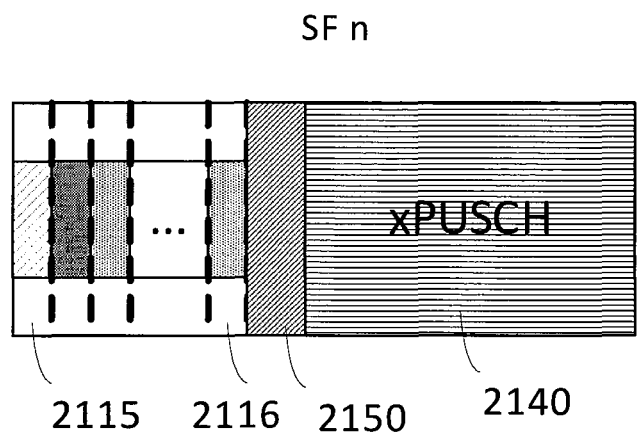
FIG. 21 illustrates another example of utilizing the initial-access subframe for Physical Downlink Shared Channel (PUSCH) according to some embodiments of the present disclosure.

FIG. 21 illustrates one example of utilizing the initial-access subframe for xPUSCH. As illustrated in FIG. 21, the initial access signal of one or multiple transmit beams is transmitted from the first OFDM symbol 2115 to $N_B$-th OFDM symbol 2116. The rest of the OFDM symbols in the initial-access subframe is used for xPUSCH. After the initial access signal region, there is a gap 2150 and then being followed by xPUSCH 2140.

Figure 22:
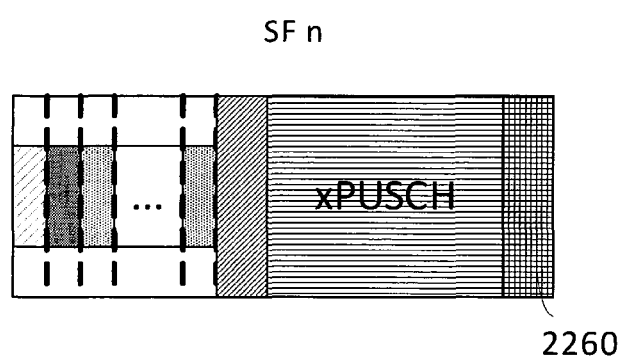
FIG. 22 illustrates yet another example of utilizing the initial-access subframe for PUSCH according to some embodiments of the present disclosure.

In some embodiment, the UCI can be transmitted in the last one or few OFDM symbols in access subframe. One example of utilizing the initial-access subframe for PUSCH is illustrated in FIG. 22. As illustrated in FIG. 22, UCI 2260 is transmitted in the last symbol in access subframe. In this case, the transmission of UCI in last OFDM symbol is signaled to UE for the xPUSCH rate matching.

Initial-Access Signal Mapping Option 2: On Multiple Consecutive Subframes

Figure 23:
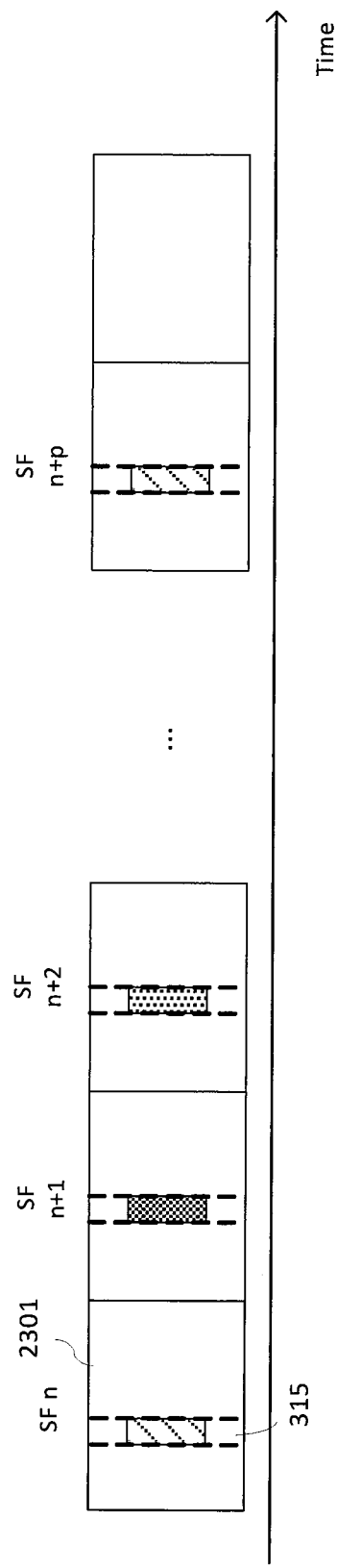
FIG. 23 illustrates an initial-access signal mapping method according to some embodiments of the present disclosure.

FIG. 23 illustrates an initial-access signal mapping method according to some embodiments of the present disclosure.

In the illustration, the initial access signals are transmitted on a few (e.g., one or two) OFDM symbol in each initial-access SF. An eNB utilizes $N_B$ beam to transmit initial access signals; and the initial access signals of each beam is transmitted in one SF and all the initial access signals are transmitted in $N_B$ contiguous downlink SFs. In one example, those downlink SFs are subframes n, n+1, . . . , n+$N_B$−1. In all those initial-access SFs, a same index OFDM symbol is used for initial access signal transmission.

In one method, the symbol index for the OFDM symbol(s) used for mapping the initial-access signals is pre-defined to be a constant. In one example, the last OFDM symbol of the initial-access SF is used.

In another method, the OFDM symbol index is determined as a function of an integer determined by sequence ID(s) of one or more initial access signal. In this case, the UE utilizes the detected sequence ID(s) to calculate at least the OFDM symbol index. In one example, the OFDM symbol index is determined as a function of the physical cell ID, wherein the physical cell ID is an integer, determined by the sequence ID(s).

In some of these embodiments, a UE can be configured to detect a subframe index by detecting an initial-access signal sequence of one of the initial access signals, say zIS. In one method, the sequence of the initial-access signal zIS is constructed such that it conveys an integer value, spanning 0, . . . , L−1. Possible ways to construct the signal sequence include (1) scrambling initialization is done differently dependent on the integer value; and (2) different ZC-sequence cyclic shift values are selected for the different integer values. Suppose L is the maximum number of consecutive subframes starting from subframe n 2301 that can be used for initial-access signal transmission. And L should not be larger than periodicity of initial-access signal transmission from one beam.

In one example, the initial-access signal transmitted by the first beam is sent in a particular subframe, say subframe $n_{SF0}$. When a UE detects an integer value $l_{SF}$ from the initial-access signal, zIS, then the UE identifies that the subframe index is subframe $n_{SF0}+l_{SF}$.

In some embodiments, the presence of zIS is an indication that the system operates in beamformed operation mode. The subsequent UE operation (rate matching, beamforming measurement reference signal detection, baseline transmission mode, etc.) will be based on the beamformed operation mode.

In some embodiments, the initial access signal is only sent in a single subframe occurring periodically for non-beamformed operation mode. In the non-beamformed operation mode, the zIS signal is absent in initial-access signal transmission and the UE is configured that the absence of zIS signal is indication of the non-beamformed operation mode. The subsequent UE operation (rate matching, baseline transmission mode, etc.) will be based on the beamformed operation mode.

Encoding of Initial-Access Information, Across Multiple Initial-Access Signals

In some embodiments, initial-access information comprises physical cell id, the OFDM symbol index and SF number. The initial access information can be encoded into the initial access sequences, xIS, yIS, and zIS. In one method, the sequence initialization is dependent upon the information. Some example methods are described below.

- Only one initial access signal sequence, xIS, is employed for a system. In some embodiments, the xIS carries the full information of physical cell ID, the OFDM symbol index, subframe boundary and/or the information of SF number.
- Two initial access signal sequences, xIS and yIS are employed for a system. In some embodiments, the xIS delivers the information of physical cell ID. The yIS conveys the information of OFDM symbol index, subframe boundary and/or the information of SF number. In some embodiments, the xIS delivers the information of physical cell ID, the information OFDM symbol index, and subframe boundary. The yIS conveys the information of SF number.
- Three initial access signal sequences, xIS, yIS and zIS are employed for a system. In some embodiments, the xIS delivers the information of physical cell ID. The yIS delivers the information OFDM symbol index, subframe boundary and the zIS delivers the information of SF number. In some embodiments, the xIS and yIS delivers the information of physical cell ID. The zIS delivers the information of OFDM symbol index, subframe boundary and/or the information of SF number. In some embodiments, the xIS and yIS delivers the information of physical cell ID, the information of OFDM symbol index and subframe boundary. The zIS delivers the information of SF number.

Indication of System Operation Mode

In some embodiments, the system operation mode—whether the system operates in beamformed mode or non-beamformed mode is indicated by implicit or explicit signaling methods during the initial access procedure.

A few alternative methods to indicate the system operation mode (beamformed operation mode vs non-beamformed operation mode) are listed below. The indication conveying the system operation mode is at least one bit, to indicate whether the system operates in beamformed operation mode or non-beamformed operation mode.

- The OFDM symbol index of an initial-access signal. In one example, initial access signals being sent on a particular OFDM symbol indicates that the system operates in non-beamformed operation mode; initial access signal being sent on other OFDM symbols indicates that the system operates in beamformed operation mode.
- Detected beam index of an initial-access signal. In one example, beam index 0 implies non-beamformed operation mode; any other beam indices indicate beamformed operation mode. In another example, In one example, beam indices 0, 1, . . . , $N_P$–1 imply non-beamformed operation mode wherein $N_P$ is total number of configured antenna ports for MRS; any other beam indices indicate beamformed operation mode.

The sequence ID of an initial-access signal. Other information can also be jointly encoded in the indication on the sequence ID.

Presence of a particular initial-access signal sequence. In one example, presence of one particular signal sequence in an initial access signal indicates that the system operates in non-beamformed operation mode; presence of another particular signal sequence in the initial access signal indicates that system operates in beamformed operation mode.

Presence and absence of a particular initial access signal. UE can use the energy detection of the particular initial access signal to determine the signaled operation mode. One example is that an eSS signal is mapped only in beamformed-operation mode. In non-beamformed operation mode, no signals are mapped to the resource of eSS (or the resource is muted). The presence and absence of eSS indicates the operation mode. In non-beamformed operation mode, eSS is not present in the eSS time-frequency resource. In beamformed operation mode, eSS is present in the eSS resource and the signal sequence in the eSS convey the information of OFDM symbol index. If one UE does not detect the presence of eSS in the eSS resource, it is configured with non-beamformed operation mode. If one UE detects the presence of eSS in eSS resource, it is configured with beamformed operation mode and it is configured to decode the OFDM symbol index information from eSS.

The physical cell ID. The physical cell IDs are partitioned into two sets. The physical cell IDs in set 1 are used for system operating in beamformed operation mode and the physical cell IDs in set 2 are used for system operating in non-beamformed operation mode.

1 bit on the MIB on xPBCH to indicate the operation mode.

1 bit on RRC signaling to indicate the operation mode.

1 bit on a system information block (SIB) to indicate the operation mode 1 bit on a dynamic DCI signaling on xPDCCH.

1 or few bits in RAR (RACH response) to indicate the operation mode

In some embodiments, the number of swept beams (or the number of OFDM symbols used for beam measurement reference signals), i.e., $N_B$, in beamformed operation mode is indicated by the initial access signals. In one method, the signal sequence ID of an initial-access signal conveys the number. In another method, the number is explicitly indicated by the xPBCH.

In some embodiments, in the initial access, the UE goes through a common cell search procedure, regardless of the system carrier frequency. The system features related to the beamformed operation (for example beam sweeping for in mmWave system) are conveyed as system parameters in the initial access signals. In one example, a UE detects the full information about physical cell ID, OFDM symbol index, subframe boundary and SF number from the initial access signals. The UE may also detect the system parameters of beamformed system through initial access signals.

Figure 24:
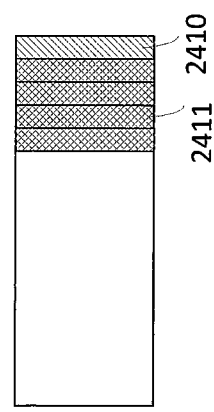
FIG. 24 illustrates one example of an initial-access subframe according to some embodiments of the present disclosure.

FIG. 24 illustrates one example of an initial-access SF. The initial access signals of a system operating in non-beamformed operation mode are transmitted in one particular symbol, for example the last OFDM symbol 2410 in an initial-access SF. The initial access signals in system operating in beamformed operation mode are transmitted in other OFDM symbols 2411 in the initial-access SF. In one such example, the OFDM symbol index information detected from the initial access signal gives 1-bit information to one UE on the system operation mode: non-beamformed or beamformed. The UE can detect the number and indices of OFDM symbols carrying the initial access signals according to some embodiments of the present disclosure (e.g., relying on zIS).

In some embodiments, a UE determines the xPDSCH rate matching for the access subframe according to the 1-bit information in the beamformed operation mode. If the 1-bit information indicates that the system operates in non-beamformed operation mode, one UE performs the xPDSCH rate matching according to the OFDM symbol index used by non-beamformed initial access signal and measurement RS. If the 1-bit information indicates that the system operates in beamformed operation mode, one UE performs the xPDSCH rate matching according to the OFDM symbol indices used by beamformed initial access signal and measurement RS.

In some embodiments, the system operating in the beamformed operation mode transmits initial access signals on the same OFDM symbol as the system operating in non-beamformed operation mode, but different signal sequences are used for initial access signals depending on the operation mode. A UE determines whether the system operates in beamformed operation mode or non-beamformed operation mode according to the detected initial access signal sequence.

Figure 25:
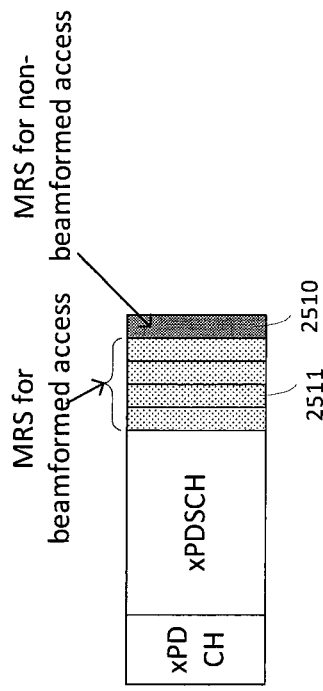
FIG. 25 illustrates measurement reference signals (MRS) transmissions according to some embodiments of the present disclosure.

FIG. 25 illustrates MRS transmissions according to some embodiments of the present disclosure.

In some embodiments, beam measurement RS (BRS, MRS or BMRS) is sent by eNB for the RRM measurement during the initial access procedure. A separate (orthogonal) measurement RS resources are provided for the beamformed operation mode and for the non-beamformed operation mode. In one example, the MRS for non-beamformed operation mode 2510 is transmitted on the last OFDM symbol of one subframe; The MRS for beamformed operation mode 2511 is transmitted on multiple OFDM symbols other the last OFDM symbol and can be transmitted with multiple coverage beams.

In some embodiments, the 1-bit information on the operation mode configures one UE to detect the related measurement reference signals. In one such embodiment, when the UE is configured to operate in the beamformed operation mode, the UE is configured to process xPBCH to decode the time-frequency resources (e.g., number of OFDM symbols in the initial-access subframe) for beam measurement reference signals and the UE is configured to perform RRM measurement utilizing the configured beam measurement reference signals 611. When the UE is configured to operate in non-beamformed operation mode, the UE is configured to perform RRM measurement utilizing the statically configured measurement reference signals 510, transmitted e.g., on the last OFDM symbol of the initial-access subframe.

Frequency Locations of Initial Access Signal

In some embodiments, the frequency location (i.e., subcarrier indices) of initial access signals in an NR carrier is not a constant, but it is separately indicated. The initial access signals can be mapped to one or more of the candidate frequency locations in an initial-access subframe. A UE is configured to detect the initial access signals and then calculate the frequency location of the detected initial access signals. The initial-access signals transmitted on each frequency location can be self-contained, from which one UE is able to extract or calculate the frequency location (i.e., subcarrier indices) where initial-access signal is mapped.

Figure 26:
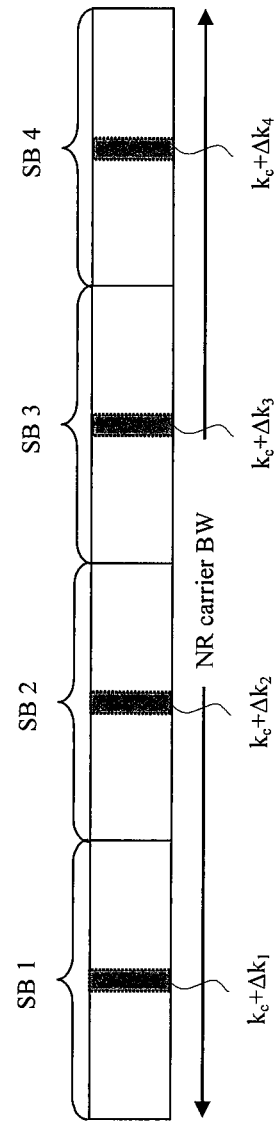
FIG. 26 shows example frequency locations of initial access signal according to some embodiments of the present disclosure.

FIG. 26 shows example frequency locations of initial access signal according to some embodiments of the present disclosure.

As illustrated in FIG. 26, where there are N=4 frequency location candidates which are $k_i=k_c+\Delta k_i$, i=1, 2, 3, 4. The initial-access signals are mapped to one (or multiple) of these candidate frequency locations, according to some embodiments of the present disclosure. These frequency locations can be identified by N candidate indices. The center-subcarrier index (or a first subcarrier index) to map initial access signal can be one (or more) of these N candidate indices. It is noted that FIG. 26 is just an example, and the same principle applies for any other N values, e.g., N=1, 2, 3, 4, 5, . . . .

In some embodiments, N can be explicitly configured by the higher layer, e.g., via MIB, SIB or RRC signaling.

The center subcarrier (or a first subcarrier) of the xPBCH corresponding to the initial access signal centered on $k_i=k_c+\Delta k_i$ is offset different from that of the initial access signal.

In one method, the center subcarrier (or a first subcarrier) for the xPBCH is $c_i=k_i+\Delta c$; in this case, the xPBCH frequency location is constant offset ($\Delta c$) different from the subband-specific initial access signal location.

Alternatively, $c_i=k_c+\Delta k_i+\Delta c_i$, and also alternatively $c_i=k_c+\Delta c_i$, wherein $\Delta c_i$ is a positive integer, for i=1, . . . , N.

In one method, a sequence ID for the initial access signal can be used for indicating the subcarrier index $k_i$. In one example, for the i-th candidate frequency location (subcarrier index $k_i$), a sequence ID for the initial access signal belongs to a set $A_i$, wherein $A_1$, $A_2$, . . . , are mutually exclusive. Then, the UE can identify the subcarrier index $k_i$ and $c_i$ for the initial access signal and xPBCH based on the detected sequence ID. This is illustrated in Table 4.

TABLE 4

|  | A set the detected sequence ID belongs to: | | | |
| --- | --- | --- | --- | --- |
|  | $A_1$ | $A_2$ | $A_3$ | $A_4$ |
| subcarrier index for the detected initial access sequence: | $k_1$ | $k_2$ | $k_3$ | $k_4$ |
| subcarrier index for the corresponding xPBCH: | $c_1$ | $c_2$ | $c_3$ | $c_4$ |

In one method, $\Delta c$ is a constant (commonly applicable) for all N candidate frequency locations, and a y-bit field either in xPBCH (MIB) or ePBCH (SIB) are used to indicate the subcarrier index $k_i$. In one example, y=1 or 2 bit(s) is/are used to indicate the frequency location of the initial access signals (subcarrier index $k_i$). Then the UE can identify the subcarrier index $k_i$ for the initial access signal from the state of the decoded bits. An example is illustrated in Table 5.

TABLE 5

|  | State of the y-bit field | | | |
| --- | --- | --- | --- | --- |
|  | A first state (00 or 0) | A second state (01 or 1) | A third state (10) | A fourth state (11) |
| subcarrier index for the detected initial access sequence: | $k_1$ | $k_2$ | $k_3$ | $k_4$ |

In one method, the initial access signal mapped to the i-th candidate frequency location recurs in the time domain with a period of $n_P$ time intervals (subframes).

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. § 112(f).

Although the present disclosure has been described with an example embodiment, various changes and modifications may be suggested to one skilled in the art. It is intended that the present disclosure encompass such changes and modifications as fall within the scope of the appended claims.

What is claimed:

1. A base station comprising:
a controller configured to map initial access signals, each of the initial access signals including a physical cell identification (ID), to a plurality of predefined time locations, respectively, and repeat the mapping with a periodicity in units of subframes; and
a transmitter configured to:
transmit the mapped initial access signals to a user equipment (UE) on a plurality of transmit beams, respectively, and
transmit a Physical Broadcast Channel (PBCH) to the UE to indicate orthogonal frequency division multiplexing (OFDM) symbols that are mapped with the initial access signals, wherein a first portion of the PBCH conveys OFDM symbol indexes of an initial access signal block containing the initial access signals, wherein a second portion of the PBCH conveys a quantity of the plurality of transmit beams being utilized by the base station, and wherein the OFDM symbols are consecutive with each other.

2. The base station of claim 1, wherein:
each of the initial access signals further includes an OFDM symbol index, and
the controller is further configured to map each of the initial access signals to one of the OFDM symbols in a subframe.

3. The base station of claim 2, wherein the transmitter is further configured to transmit, to the UE, data and control messages mapped to other OFDM symbols in the subframe that are not mapped with the initial access signals.

4. The base station of claim 2, wherein the initial access signals are repeatedly mapped to same OFDM indexes in each of a plurality of subframes.

5. The base station of claim 1, wherein each of the initial access signals further includes an OFDM symbol index and a subframe number.

6. The base station of claim 1, wherein the transmitter is further configured to transmit an extended synchronization signal (ESS) to the UE to indicate OFDM symbol indexes of an initial access signal block containing the initial access signals.

7. A method for operating a base station, the method comprising:
mapping one or more initial access signals, each of the initial access signals including a physical cell identification (ID), to a plurality of predefined time locations, respectively, and repeat the mapping with a periodicity in units of subframes;

transmitting the mapped initial access signals to a user equipment (UE) on a plurality of transmit beams, respectively; and transmit a Physical Broadcast Channel (PBCH) to the UE to indicate orthogonal frequency division multiplexing (OFDM) symbols that are mapped with the one or more initial access signals, wherein a first portion of the PBCH conveys OFDM symbol indexes of an initial access signal block containing the initial access signals, wherein a second portion of the PBCH conveys a quantity of the plurality of transmit beams being utilized by the base station, and wherein the OFDM symbols are consecutive with each other.

8. The method of claim 7, wherein:

each of the initial access signals further includes and an OFDM symbol index, and the method further comprises mapping each of the initial access signals to one of the OFDM symbols in a subframe.

9. The method of claim 8, further comprising transmitting data and control messages mapped to other OFDM symbols in the subframe that are not mapped with the initial access signals.

10. The method of claim 8, wherein the initial access signals are repeatedly mapped to same OFDM indexes in each of a plurality of subframes.

11. The method of claim 7, wherein each of the initial access signals further includes an OFDM symbol index and a subframe number.

12. The method of claim 7, further comprising transmitting an extended synchronization signal (ESS) to the UE to indicate OFDM symbol indexes of an initial access signal block containing the initial access signals.

13. A user equipment (UE) comprising:

a transceiver configured to:

receive a Physical Broadcast Channel (PBCH) from a base station, the PBCH including an indication of orthogonal frequency division multiplexing (OFDM) symbols that are mapped with initial access signals, wherein a first portion of the PBCH conveys OFDM symbol indexes of an initial access signal block containing the initial access signals, wherein a second portion of the PBCH conveys a quantity of a plurality of transmit beams being utilized by the base station, and wherein the OFDM symbols are consecutive with each other; and receive, from the base station, the initial access signals mapped to a plurality of predefined time locations, respectively, wherein the mapping is repeated with a periodicity in units of subframes, and wherein each of the initial access signals include a physical cell identification (ID); and a controller configured to perform an initial access to the base station via at least one of the plurality of transmit beams based on the initial access signals.

14. The UE of claim 13, wherein:

each of the initial access signals further includes and a OFDM symbol index, and the controller is further configured to map each of the initial access signals to each of a plurality of one of OFDM symbols in a subframe.

15. The UE of claim 14, wherein the transceiver is configured to receive, from the base station, data and control messages are mapped to other OFDM symbols in the subframe that are not mapped with initial access signals.

16. The UE of claim 14, wherein the initial access signals are repeatedly mapped to same OFDM indexes in each of a plurality of subframes.

17. The UE of claim 13, wherein each of the initial access signals further includes an OFDM symbol index and a subframe number.

18. The UE of claim 13, wherein the transceiver is further configured to:

receive an extended synchronization signal (ESS) to determine OFDM symbol indexes of an initial access signal block containing the initial access signals is transmitted, and transmit data and control messages on OFDM symbols that are not mapped with the initial access signals.

* * * * *